(12) United States Patent
Beck

(10) Patent No.: US 12,057,747 B2
(45) Date of Patent: Aug. 6, 2024

(54) ROTARY ELECTRICAL MACHINE USING TIME-INVARIANT MAGNETIC FIELDS

(71) Applicant: Douglas S. Beck, Poulsbo, WA (US)

(72) Inventor: Douglas S. Beck, Poulsbo, WA (US)

(*) Notice: Subject to any disclaimer, the term of this patent is extended or adjusted under 35 U.S.C. 154(b) by 0 days.

(21) Appl. No.: 17/326,836

(22) Filed: May 21, 2021

(65) Prior Publication Data
US 2022/0385158 A1    Dec. 1, 2022

(51) Int. Cl.
*H02K 21/12*    (2006.01)
*H02K 9/00*    (2006.01)
*H02K 21/02*    (2006.01)
*H02K 21/20*    (2006.01)

(52) U.S. Cl.
CPC ............. *H02K 21/20* (2013.01); *H02K 9/00* (2013.01); *H02K 21/022* (2013.01); *H02K 21/028* (2013.01)

(58) Field of Classification Search
CPC ......... H02K 16/02; H02K 21/20; H02K 21/24
See application file for complete search history.

(56) References Cited

U.S. PATENT DOCUMENTS

| 5,434,462 A | 7/1995 | Leupold et al. | |
| 8,017,864 B2 * | 9/2011 | Phillips | D07B 1/147 174/36 |
| 10,075,030 B2 | 9/2018 | Klassen | |
| 10,141,822 B2 | 11/2018 | Ricci | |
| 10,263,480 B2 | 4/2019 | Hunstable | |
| 2014/0252900 A1 | 9/2014 | Mandes | |
| 2015/0244219 A1 | 8/2015 | Woolmer | |

FOREIGN PATENT DOCUMENTS

| CN | 112583146 A | * | 3/2021 | ............. H02K 1/145 |
| JP | 2016021510 A | * | 2/2016 | |

OTHER PUBLICATIONS

PCT International Search Report and Written Opinion, International Application No. PCT/US2022/024004, mailed Jul. 29, 2022, 6 pages.

* cited by examiner

*Primary Examiner* — Ramon M Barrera
(74) *Attorney, Agent, or Firm* — AEON Law, PLLC; Adam L. K. Philipp; James Namiki

(57) ABSTRACT

A rotary electrical machine comprises: a mechanical motor/generator assembly, and optional electronics. The mechanical motor/generator assembly comprises: a core assembly, and an armature assembly. The core assembly comprises two magnet assemblies, which are positioned to define an air gap therebetween and produce time invariant magnetic fields in the air gap. The armature assembly comprises: an armature, and one or more conductors that are mounted to the armature and positioned in the air gap. Either the core assembly or the armature assembly may be mounted to a rotating element, while the other is mounted to a stationary element. During operation as a motor, electrical current flows in alternating directions in the one or more conductors, to produce torque on the armature and rotating element. During operation as a generator, electrical current is produced in the one or more conductors when torque is applied to the rotating element and the armature.

15 Claims, 34 Drawing Sheets

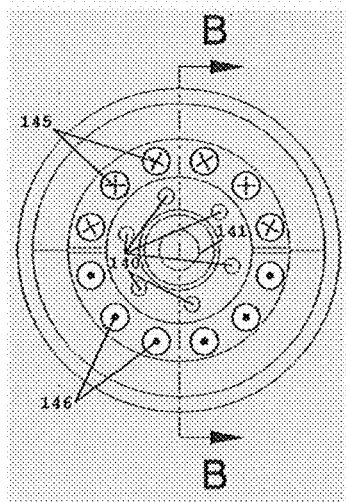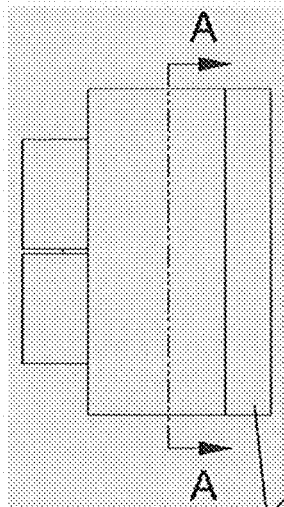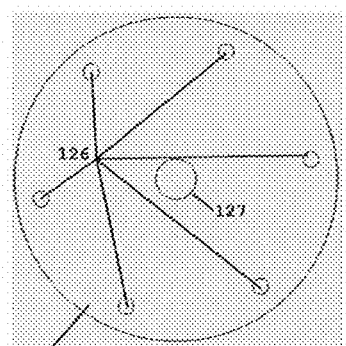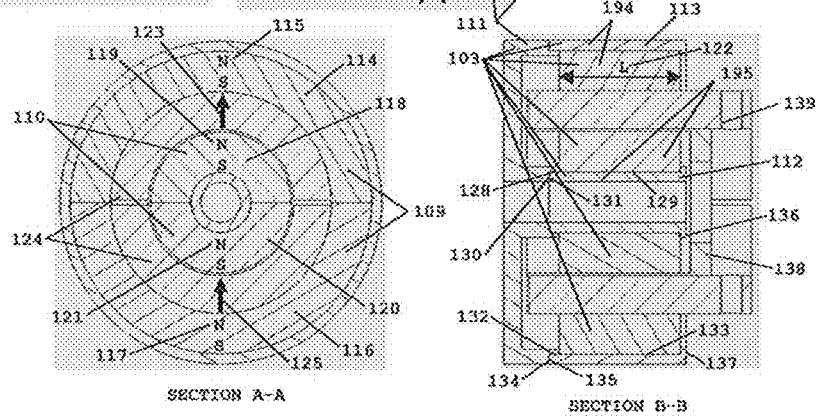

FIG. 10A
FIG. 10B
FIG. 10C
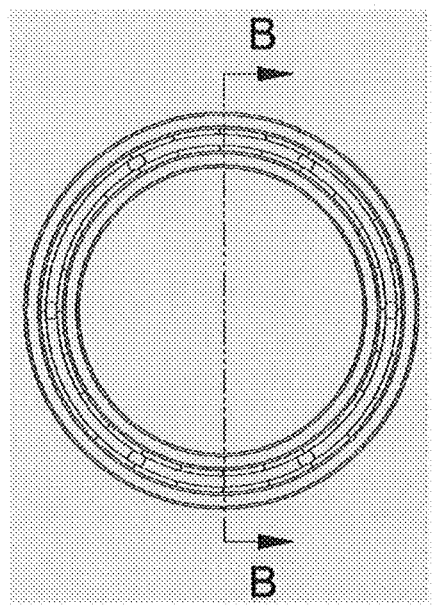
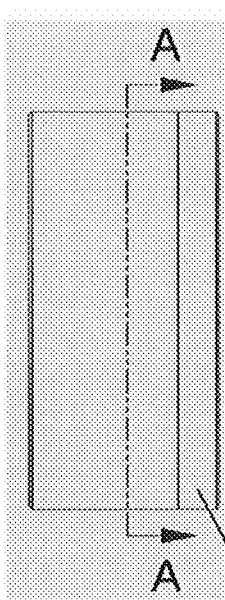
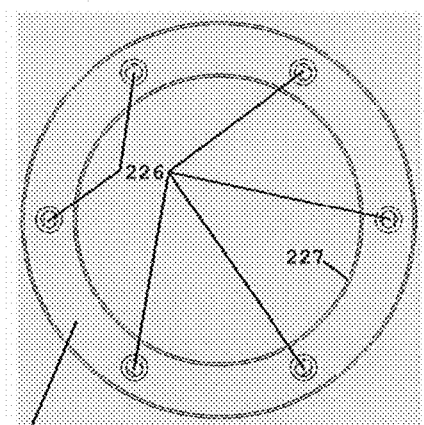
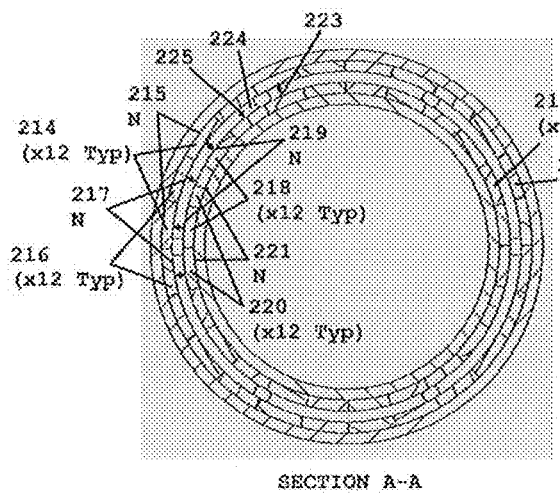
SECTION A-A
FIG. 10D
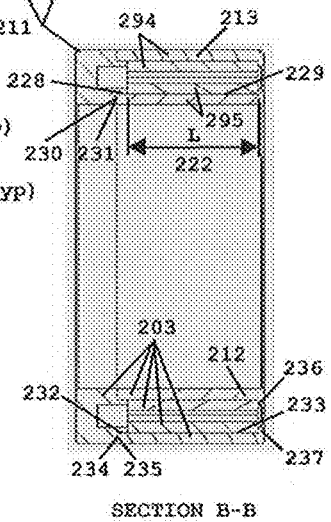
SECTION B-B
FIG. 10E

SECTION A-A

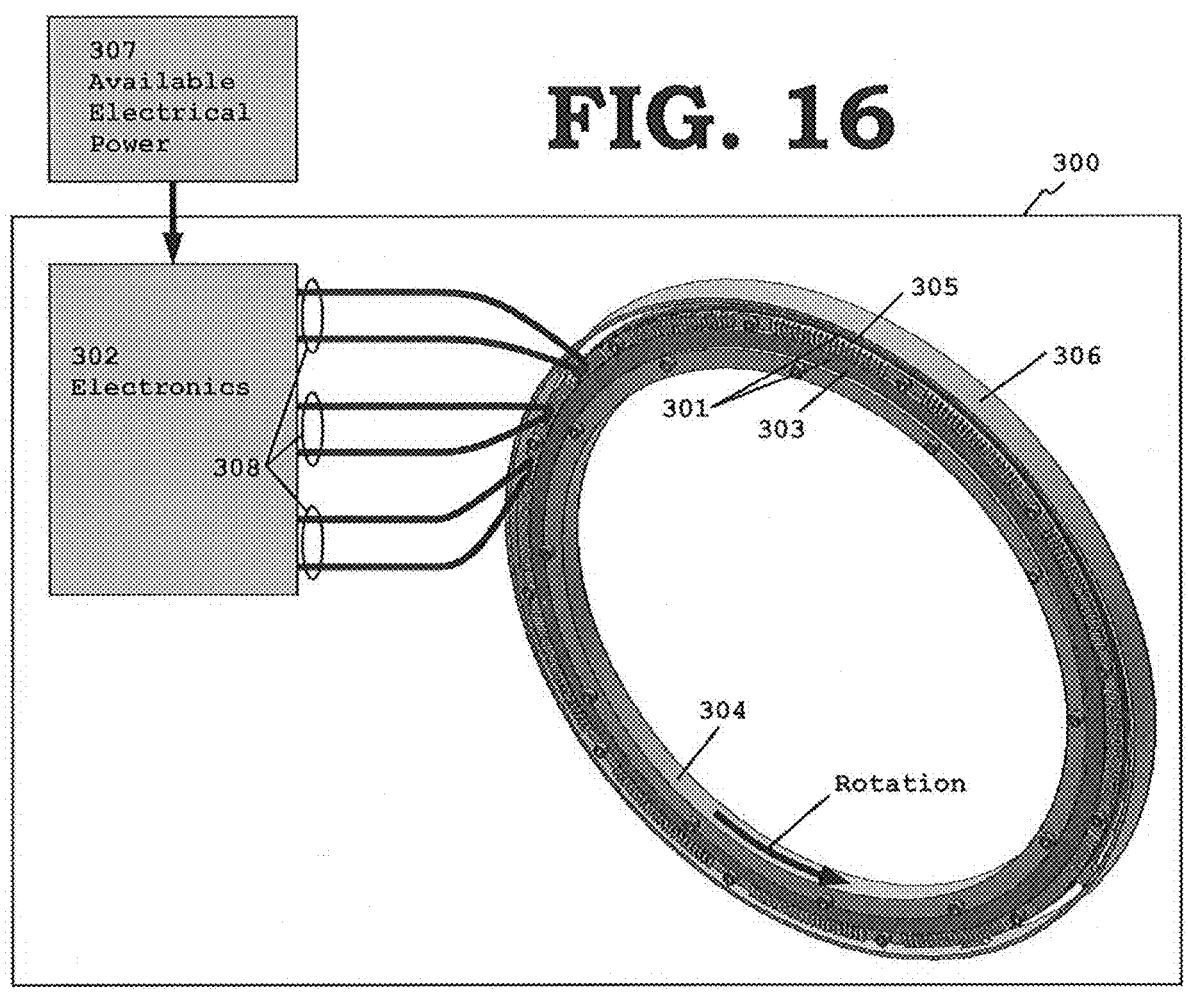

SECTION A-A 200 hp (150 kW) at 7,600 RPM
99.1% Efficient
11.0 lbm (5.0 kg)
18.2 hp/lbm (30.0 kW/kg)
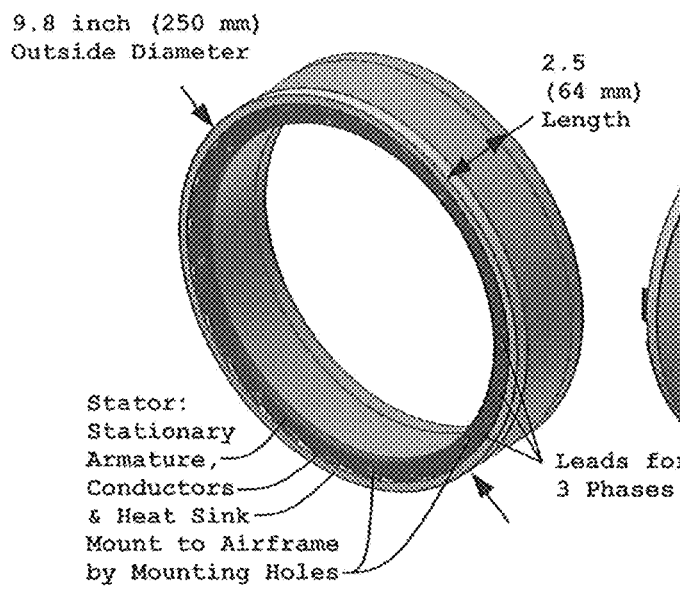
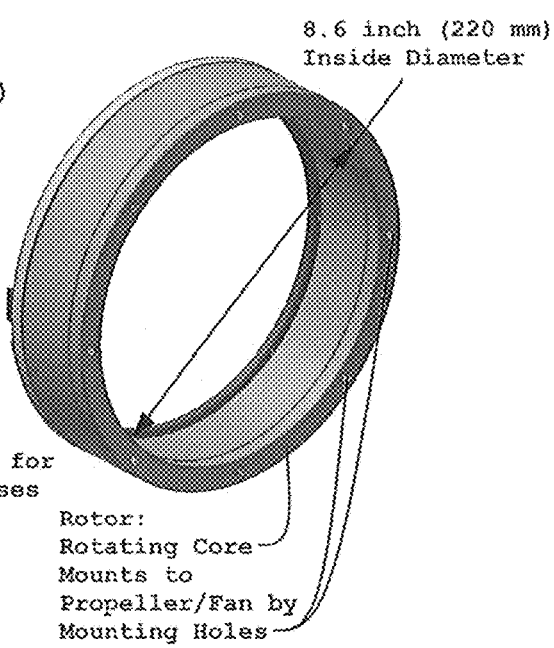
FIG. 21

FIG. 27A  FIG. 27B
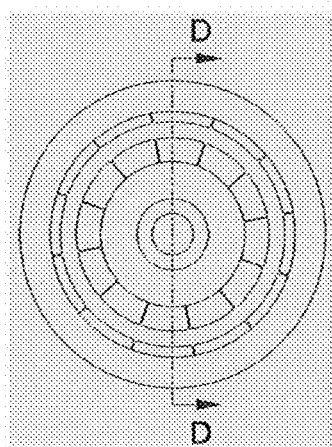
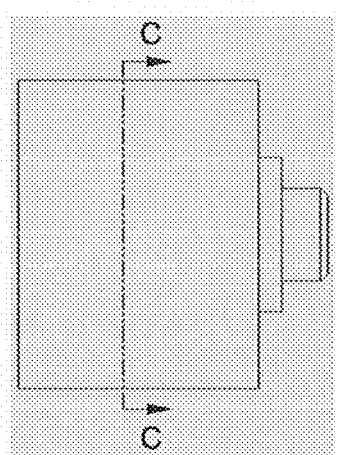
FIG. 27C
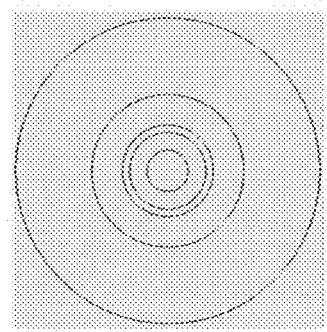
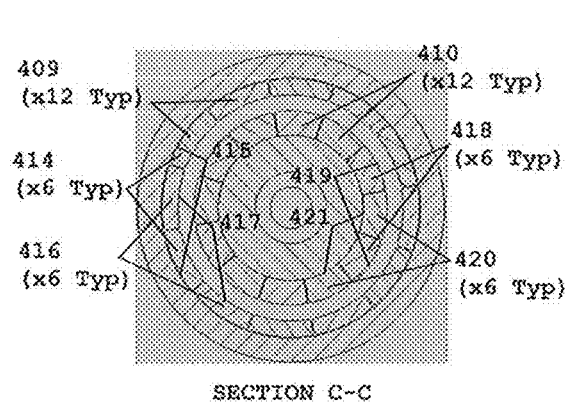
SECTION C-C
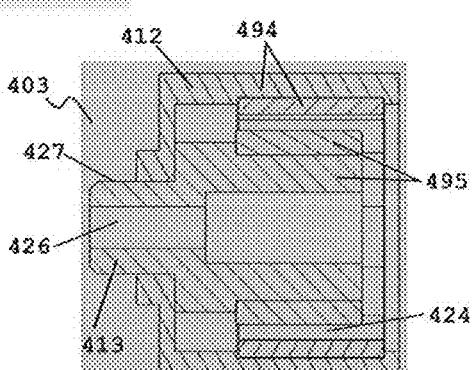
SECTION D-D
FIG. 27D  FIG. 27E

ROTARY ELECTRICAL MACHINE USING TIME-INVARIANT MAGNETIC FIELDS

TECHNICAL FIELD

This invention relates generally to electrical machines (which operate as either motors or generators, or as both motors and generators), and more specifically concerns a rotary electrical machine that uses time-invariant magnetic fields.

BACKGROUND OF THE INVENTION

An electrical machine operates as either an electrical motor or as an electrical generator, or as both an electrical motor and as an electrical generator. An electrical motor converts electrical power into mechanical power, and an electrical generator converts mechanical power into electrical power. A linear electrical motor converts electrical power into linear (or reciprocating) mechanical power, and a linear electrical generator converts linear (or reciprocating) mechanical power into electrical power. A rotary electrical motor converts electrical power into rotational mechanical power, and a rotary electrical generator converts rotational mechanical power into electrical power.

Rotary electrical motors and generators are ubiquitous, with applications ranging spatially from the bottoms of the oceans to deep space, and with power levels from less than ten 10 watts to greater than 100 MW. Applications include turbo-generators for generating electrical power from thermal power from hydrothermal vents on the ocean floors; motors and generators for underwater vehicles, including submarines and Unmanned Underwater Vehicles (UUVs); motors and generators for surface ships, including U.S. Navy all-electric surface ships and Unmanned Surface Vehicles (USVs); turbo-generators for offshore oil rigs; generators for land-based power generation and co-generation; motors and generators for land vehicles, including hybrid-electric and Electric Vehicles (EVs); industrial motors; motors for home appliances; motors and generators for aircraft, including electric jet packs and urban air taxis, hybrid-electric and electric commercial aircraft, military more-electric aircraft, Unmanned Aerial Vehicles (UAVs), and Unmanned Aerial Systems (UASs); motors and actuators for spacecraft; and generators for space-based power generation. The 2021 global annual market for rotary electrical motors and generators is conservatively estimated to be greater than $1 trillion. The 2021 global annual market for platforms (e.g. machines or installations) that include rotary electrical motors and generators is conservatively estimated to be greater than $10 trillion.

Existing rotary electrical motors and generators use the same basic principle of operation that has been used since rotary motors and generators were invented in the 1800s. A motor or a generator generally consists of one or two components: (1) a mechanical motor/generator assembly, which either converts supplied electrical power into mechanical power (for a motor) or converts mechanical power into electrical power (for a generator); and (2) optional electronics, which convert available electrical power into a form that can be used by a motor, or convert the electrical power produced by a generator into a useful form, if necessary. For clarity in the following, we describe the principle of operation of the mechanical motor/generator assembly of one specific type of rotary electrical motor; however, the mechanical motor/generator assemblies of many rotary electrical motors can also operate as mechanical motor/generator assemblies of rotary electrical generators, and the same basic principle of operation can be applied to many alternative configurations. The mechanical motor/generator assembly of the motor consists of a stationary stator and a rotating rotor. Electronics apply a time-varying voltage across an electrical conductor (which is also known as a "winding", and which is typically a coil of wire). The voltage induces a time-varying electrical current through the conductor. The time-varying electrical current, in turn, induces a time-varying magnetic field in a pole in the stator, with each end of the pole alternating between north-pole and south-pole magnetic polarity. The time-varying magnetic field alternately attracts and repels a magnetic pole in the rotor. The forces of attraction and repulsion provide torque and rotational mechanical power to the rotor. The same basic principle of operation can be applied to many alternative configurations. For example, voltage could be applied to generate a time-varying magnetic field in the pole of a rotor (rather than in a stator, as described above). Also, multiple poles typically operate in parallel.

Existing rotary electrical motors and generators have well-known problems that lead to electrical and volumetric inefficiencies. The time-varying magnetic fields lead to core loss, which is the combination of hysteresis loss, eddy-current loss, and excess loss in the soft-magnetic materials from which the poles are often made. Core loss causes some of the input power (input electrical power to a motor or input mechanical power to a generator) to be dissipated as waste heat. Core loss is proportional to the square of the operating frequency, so existing rotary electrical motors and generators are especially inefficient at high rotational speeds. Implementation of the principle of operation of existing motors and generators requires large volumes for conductors, poles, and passages for coolant (which absorbs waste heat from core loss and Joule heating in the conductors). The large volumes lead to volumetric inefficiencies and low power-densities (power input/output divided by mass) for existing motors and generators.

Current-art motors all use the same basic principle of operation described above, in which time-varying magnetic fields alternately attract and repel other magnetic fields. Current-art electrical machines include: the NASA High Efficiency Megawatt Motor (HEMM, which has patent-pending status) [1,2][1], and permanent magnet axial flux electrical machines [3, 10-12].

[1]Numbers in square brackets ([ ]) refer to references listed at the beginning of the patent application.

Voice-coil linear motors (which are sometimes called actuators) and generators use an entirely different principle of operation to convert electrical power into linear mechanical power (as a motor) and linear mechanical power into electrical power (as a generator). Voice-coil linear motors and generators have been used in loudspeakers (as motors) and microphones (as generators) since the 1920s and 1930s. Also, voice-coil linear actuators have been used in reciprocating compressors and expanders of space-based cryogenic refrigerators (which are often called "cryocoolers") for decades. A voice-coil linear motor consists of: a core that uses magnets (either permanent magnets or electro-magnets) and pole pieces, which are made from soft-magnetic materials, to create a magnetic circuit, which generates a constant (time-invariant) magnetic field in an air gap; and (2) an armature, to which is secured one (or more) electrical conductors that is (are) located in the air gap. Electronics apply a time-varying voltage across each electrical conductor. The time-varying voltage induces a time-varying electrical current in the conductor. The time-varying current flowing through the conductor in the time-invariant magnetic field produces a time-varying Lorentz force on the conductor, according to the following vector equation for the Lorentz force:

$$F = iL \times B \qquad (1)$$

where,
F=Vector force, N;
i=Electrical current, A;
L=Vector length of the conductor in the magnetic field, in; and
B=Vector magnetic field, T.

The time-varying Lorentz force produces linear reciprocating mechanical power, in directions that follow the right-hand rule of the cross product in the vector equation for the Lorentz force (EQN. 1). Unlike existing rotary electrical motors and generators, voice-coil linear motors and generators have no time-varying magnetic fields in soft magnetic materials, so voice-coil linear motors and generator have zero core loss. With zero core loss, voice-coil linear motors and generator can have high electrical efficiencies and can operate at high reciprocating frequencies with high electrical efficiencies. Also, conductors (typically wire) can fill air gaps with high packing efficiencies (packing efficiency is filled cross-sectional area, divided by total cross-sectional area), so voice-coil linear motors and generators can have high volumetric efficiencies and high power-densities. The Lorentz force has been used in motors/actuators that produce mechanical power through an arc of rotation; however, before the present invention, the Lorentz force has never been used in motors that convert electrical power into rotational mechanical power (through multiple rotations) nor in generators that convert rotational mechanical power (through multiple rotations) into electrical power.

a stationary element. Alternatively, the core assembly may be mounted to a stationary element while the armature assembly is mounted to a rotating element. During operation as a motor, electrical current flows in alternating directions in the one or more conductors, to produce torque on the armature and rotating element when a voltage is applied across one or more conductors. During operation as a generator, electrical current is produced in the one or more conductors when torque is applied to the rotating element and the armature.

BRIEF DESCRIPTION OF THE DRAWINGS

FIG. 2A is a front view of a preferred embodiment of the invention: a single-phase two-pole motor.

FIG. 2B is right-hand side view of a preferred embodiment of the invention: a single-phase two-pole motor.

FIG. 2C is a rear view of a preferred embodiment of the invention: a single-phase two-pole motor.

FIG. 2D is a cross-sectional view of a front view of a preferred embodiment of the invention: a single-phase two-pole motor.

FIG. 2E is a cross-sectional view of a left-hand side view of a preferred embodiment of the invention: a single-phase two-pole motor.

Figure 1:
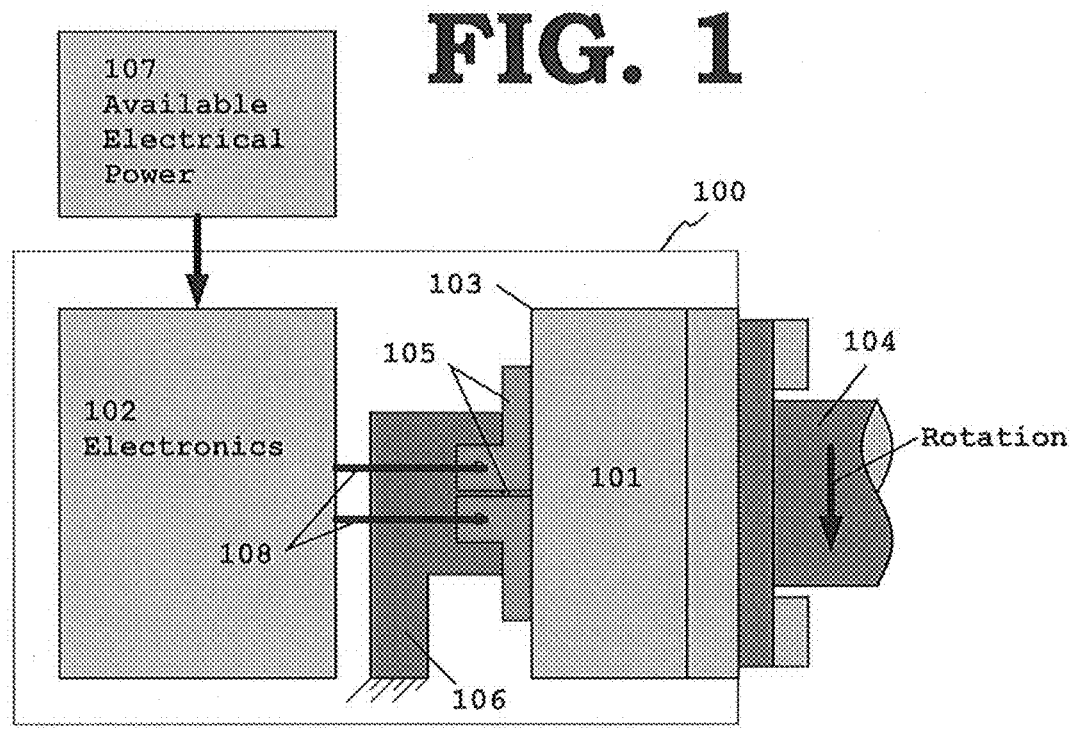
FIG. 1 is a schematic diagram that shows a preferred embodiment of the invention: a single-phase two-pole motor.

Refrences Cited 1. https://ntts-prod.s3.amazonaws.com/t2p/prod/t2media/tops/pdf/LEW-TOPS-140.pdf
2. https://www.techbriefs.com/component/content/article/tb/supplements/md/briefs/38137
3. https://www.designnews.com/new-generation-axial-flux-ev-motors
4. https://vortexhobbies.com/great-planes-ammo-3600kv-brushless-inrunner-motor-gpmg5220-p-11131.html
5. https://amr-rc.com/rimfire-65cc-80-85-160-outrunner-brushless-motor.html
6. https://en.wikipedia.org/wiki/Power-to-weight_ratio
7. http://www.tppowereurope.com/Webwinkel-Product-286088410/TP100L.html
8. https://emrax.com/e-motors/emrax-268/
9. https://www1.grc.nasa.gov/aeronautics/eap/larger-aircraft/electric-machines/

U.S. PATENT DOCUMENTS

| 10. U.S. Pat. No. 10,141,822B2 | November 2018 | Ricci |
| 11. U.S. Pat. No. 20,150,244219A1 | February 2020 | Woolmer |
| 12. U.S. Pat. No. 10,075,030B2 | September 2018 | Klassen |

SUMMARY OF THE INVENTION

Figure 4:
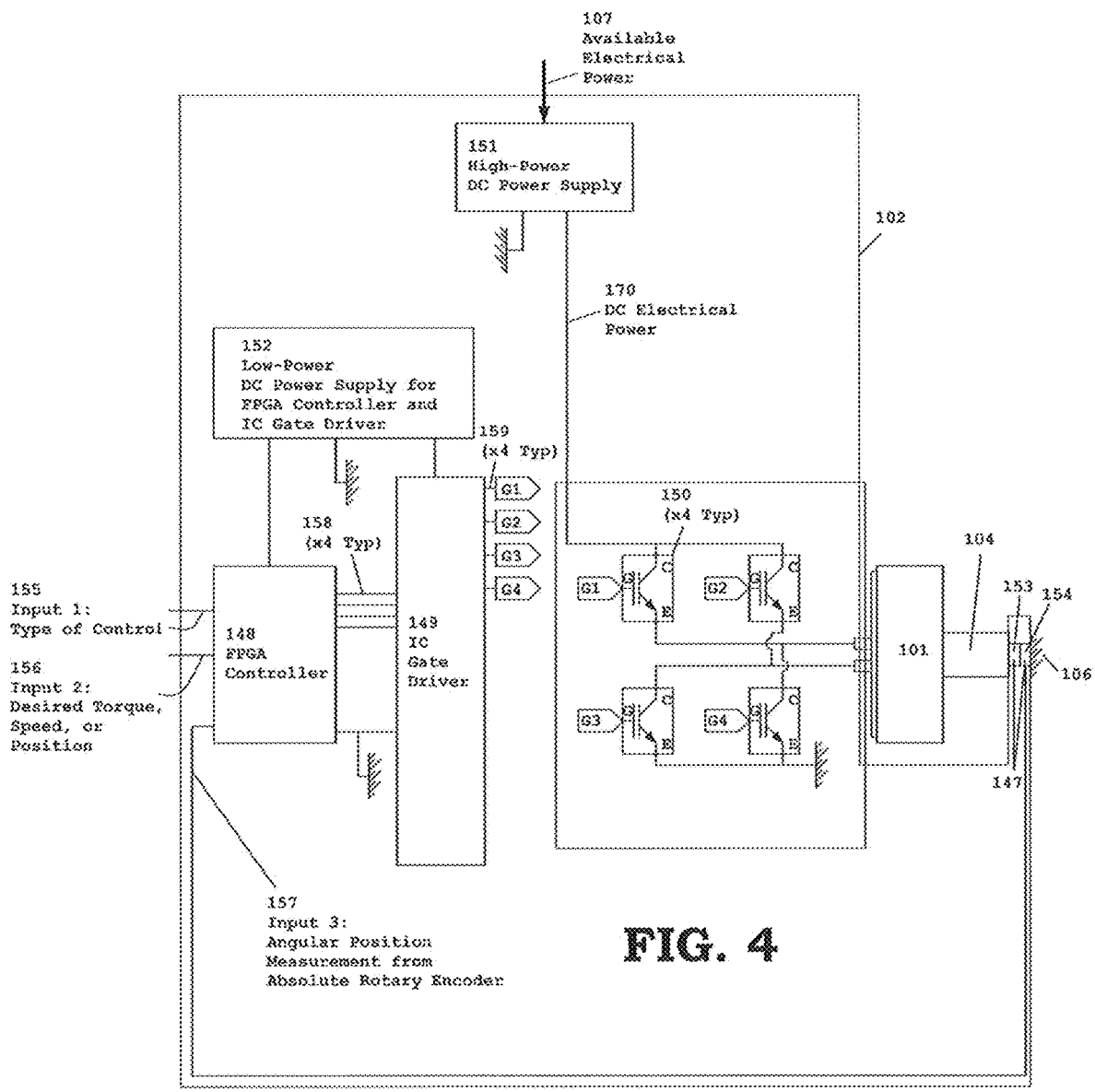

Accordingly, the present invention is a rotary electrical machine that uses time-invariant magnetic fields. The rotary electrical machine comprises: a mechanical motor/generator assembly, and optional electronics. The mechanical motor/generator assembly comprises: a core assembly, and an armature assembly. The core assembly comprises two magnet assemblies, which are positioned to define an air gap therebetween and produce time invariant magnetic fields in the air gap. The armature assembly comprises: an armature, and one or more conductors that are mounted to the armature. The conductors have electrical leads and are positioned in the air gap. The core assembly may be mounted to a rotating element while the armature assembly is mounted to FIG. 4 is a schematic diagram that shows the electronics of a single-phase two-pole motor preferred embodiment.

Figure 5A:
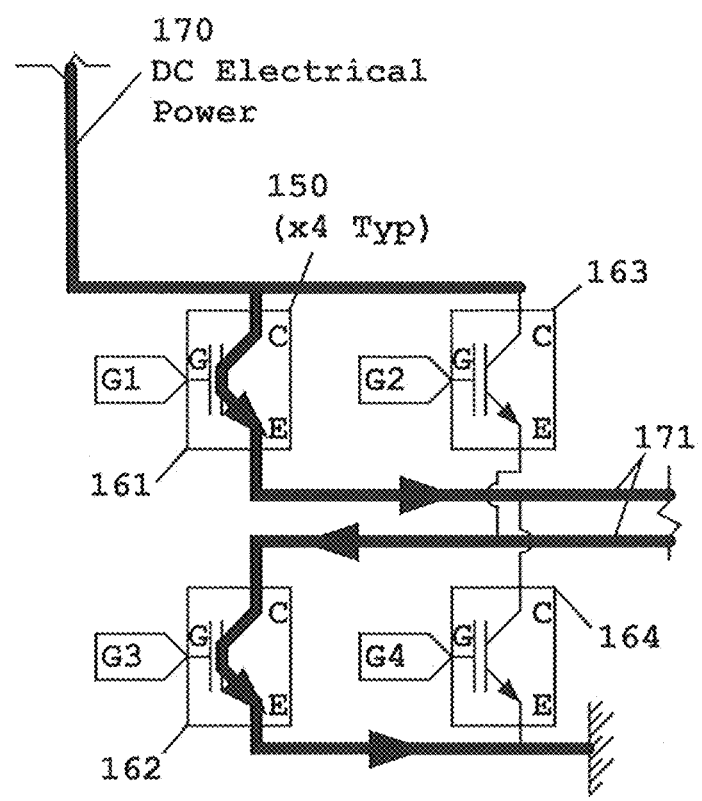

FIG. 5A is a schematic diagram that shows how a full H-bridge electrical circuit produces positive current.

Figure 5B:
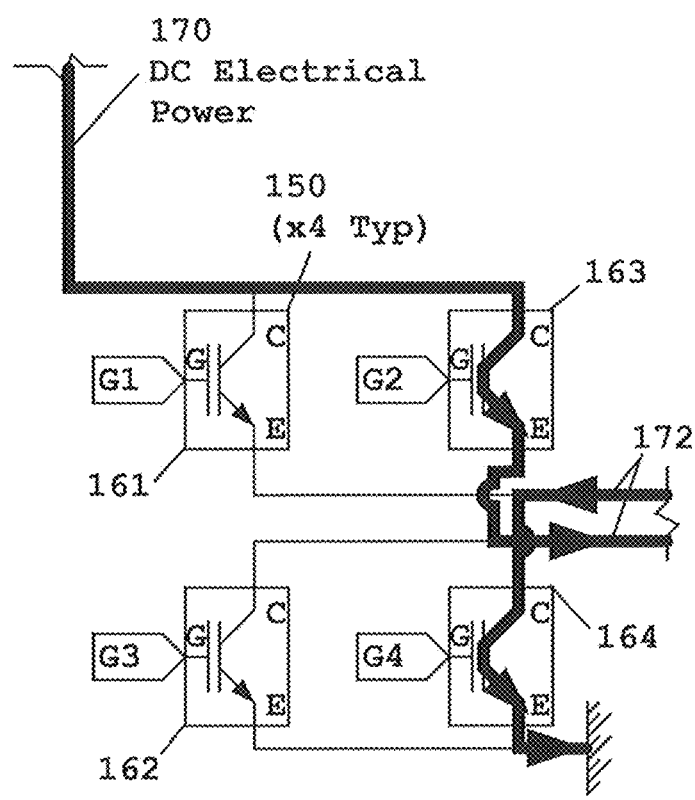

FIG. 5B is a schematic diagram that shows how a frill H-bridge electrical circuit produces negative current.

Figure 5C:
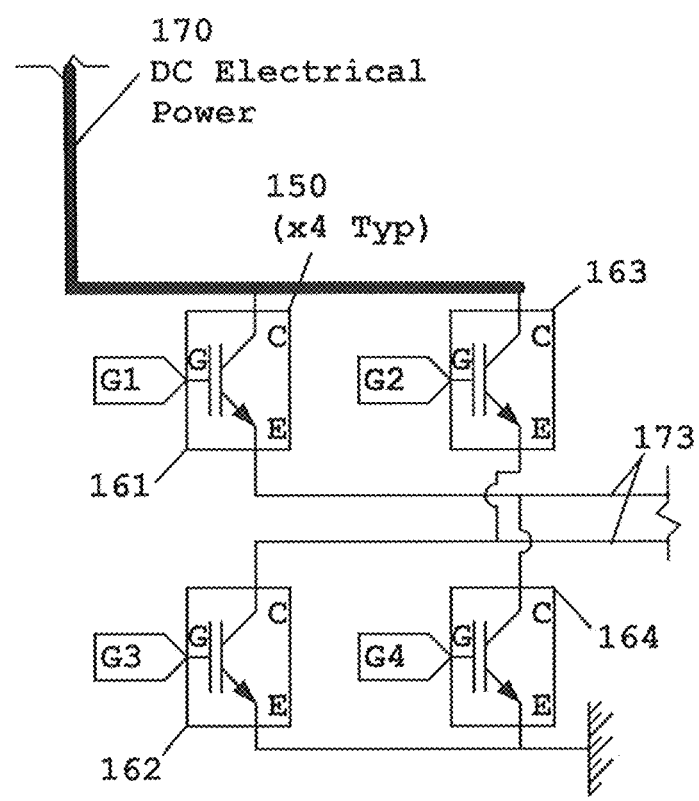

FIG. 5C is a schematic diagram that shows how a frill H-bridge electrical circuit produces zero current.

Figure 6A:
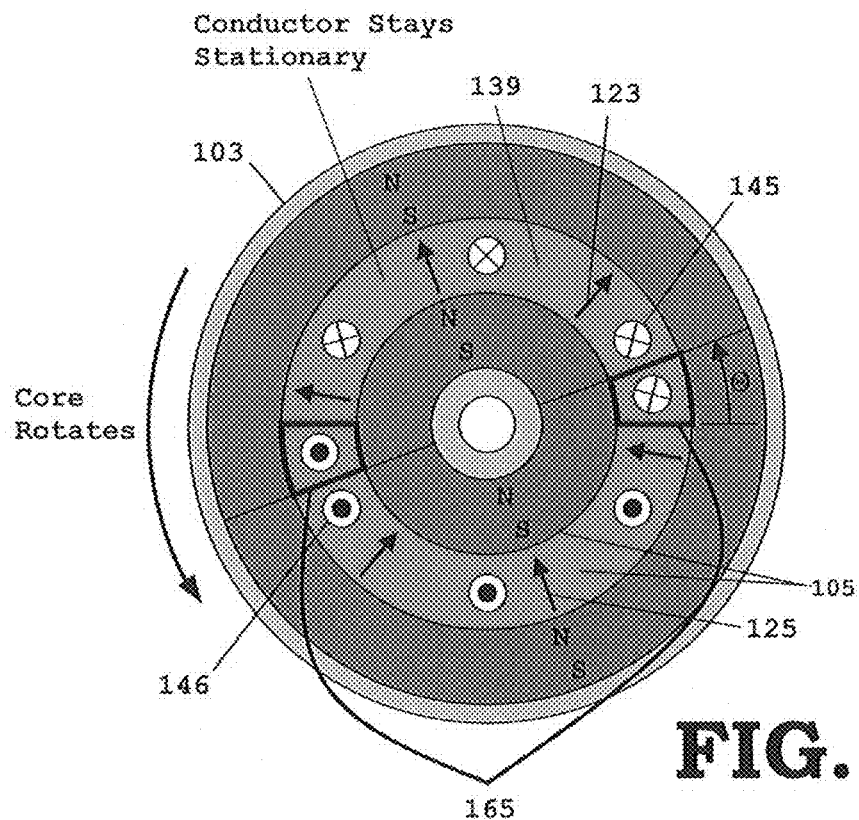

FIG. 6A is a schematic diagram that shows portions of the conductor of the single-phase two-pole motor of the preferred embodiment that produce restraining torques at full power.

Figure 6B:
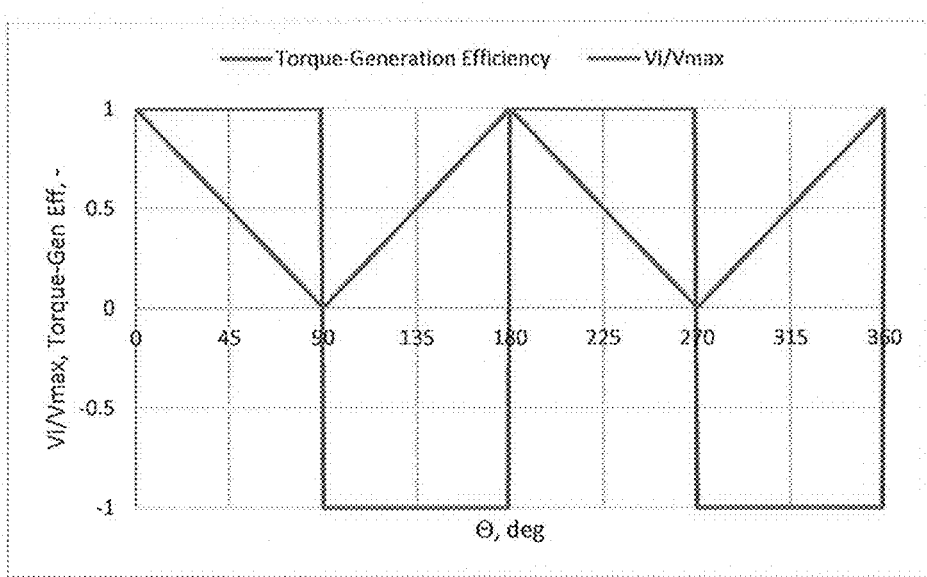

FIG. 6B is a schematic diagram that shows how the conductor of the single-phase two-pole motor of the preferred embodiment is fired at full power and the resulting torque-generation efficiency.

Figure 7A:
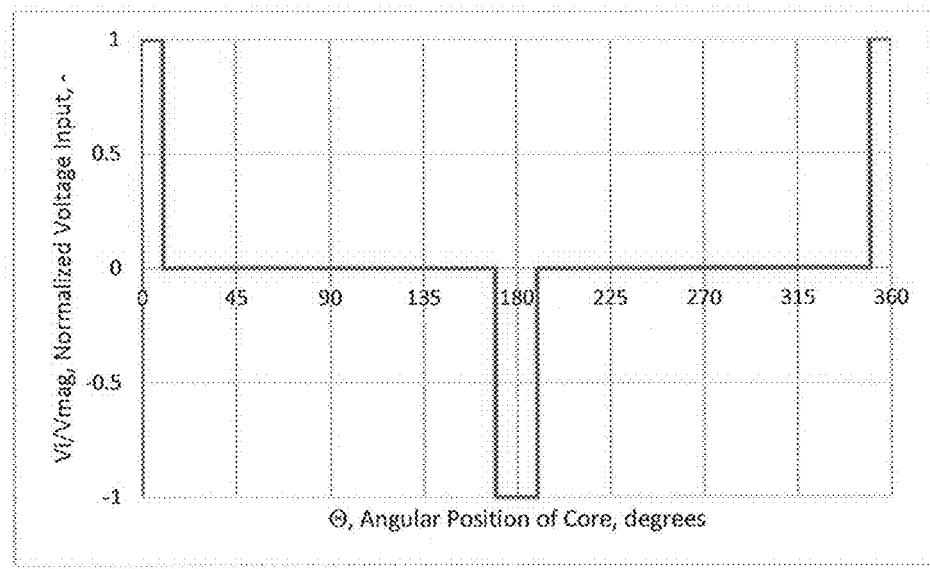

FIG. 7A is a schematic diagram that shows how the single-phase two-pole motor of the preferred embodiment is powered at low power.

Figure 7B:
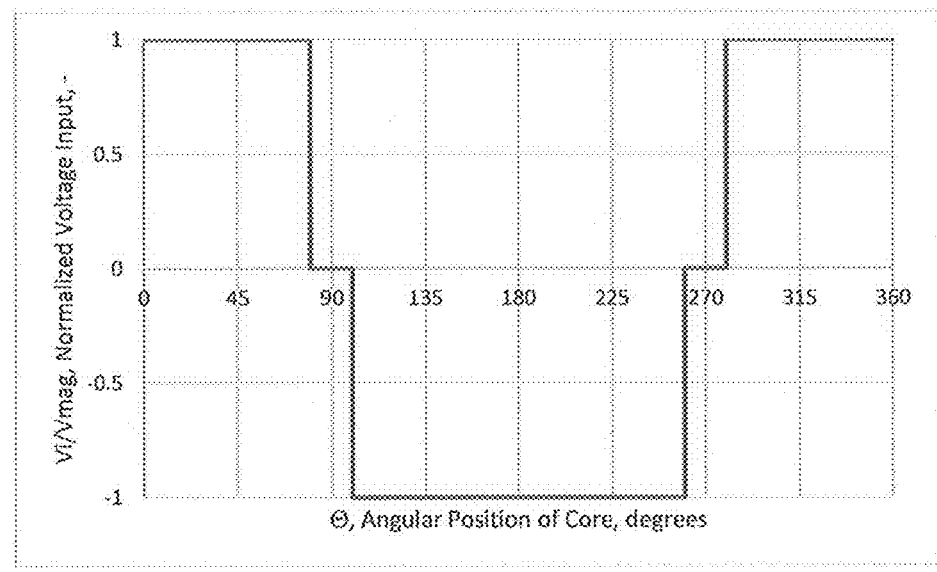

FIG. 7B is a schematic diagram that shows how the single-phase two-pole motor of the preferred embodiment is powered at moderate power.

Figure 8:
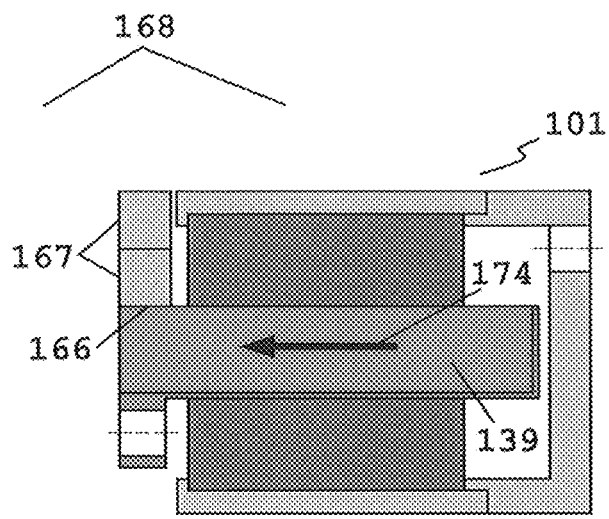

FIG. 8 is a schematic diagram that shows how the invented electrical machine rejects waste heat.

Figure 9:
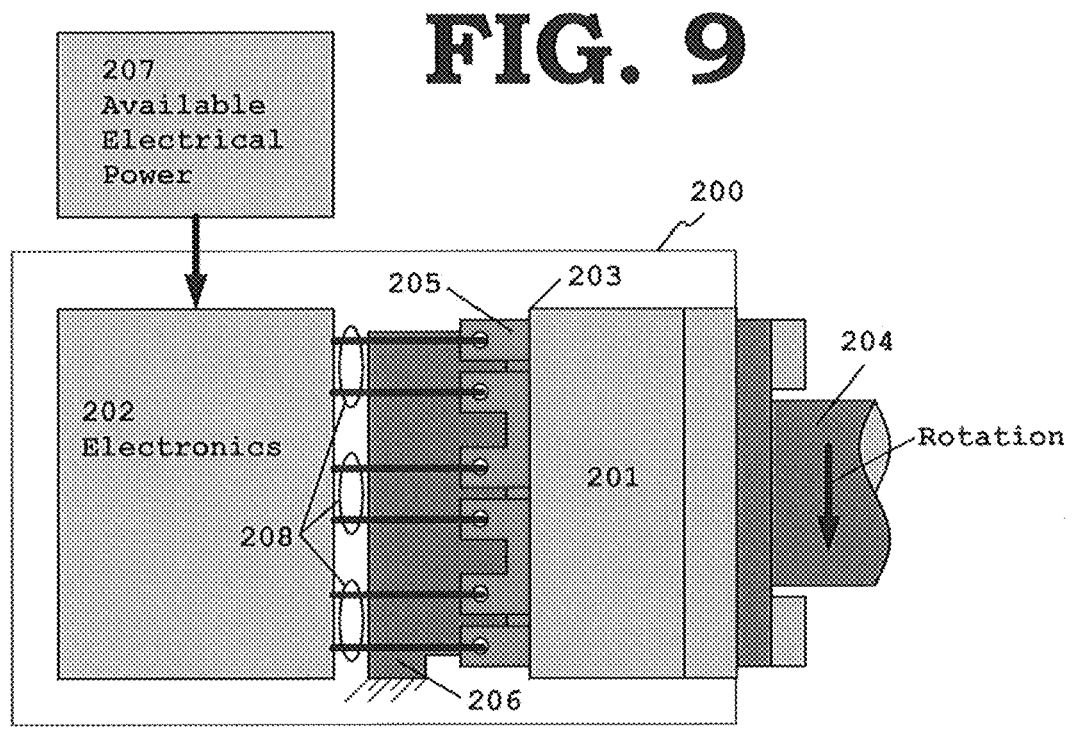

FIG. 9 is a schematic diagram that shows a preferred embodiment of the invention: a three-phase 24-pole motor.

FIG. 10A is a front view that shows details of the core of a three-phase 24-pole preferred embodiment motor.

FIG. 10B is a right-hand side view that shows details of the core of a three-phase 24-pole preferred embodiment motor.

FIG. 10C is a rear view that shows details of the core of a three-phase 24-pole preferred embodiment motor.

FIG. 10D is a cross-sectional view of a front view that shows details of the core of a three-phase 24-pole preferred embodiment motor.

FIG. 10E is a cross-sectional view of a left-hand side view that shows details of the core of a three-phase 24-pole preferred embodiment motor.

Figure 11A:
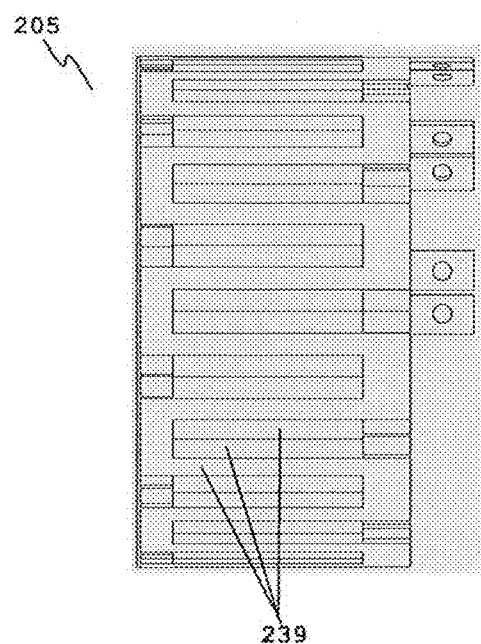

FIG. 11A is a left-hand side view of the conductors of a three-phase 24-pole preferred embodiment motor.

Figure 11B:
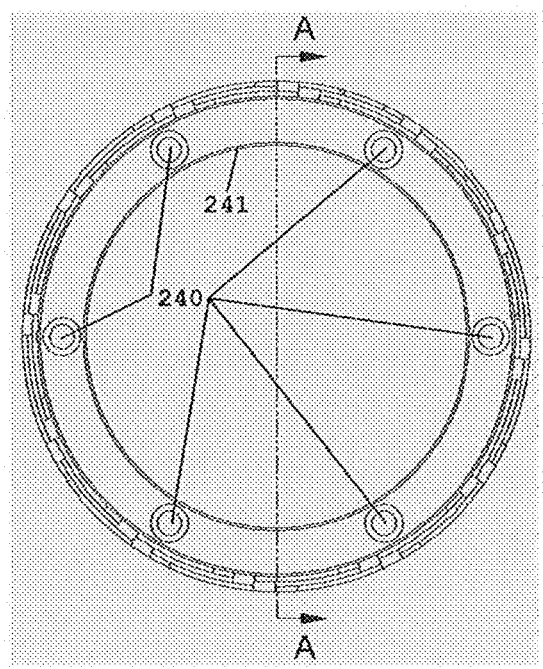

FIG. 11B is a front view of the conductors of a three-phase 24-pole preferred embodiment motor.

Figure 11C:
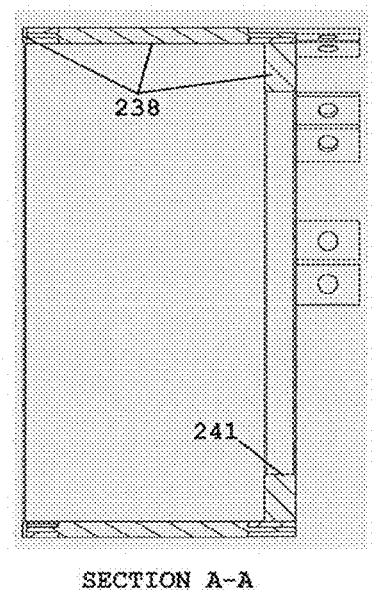

FIG. 11C is a cross-sectional view of a left-hand side view of the conductors of a three-phase 24-pole preferred embodiment motor.

Figure 12:
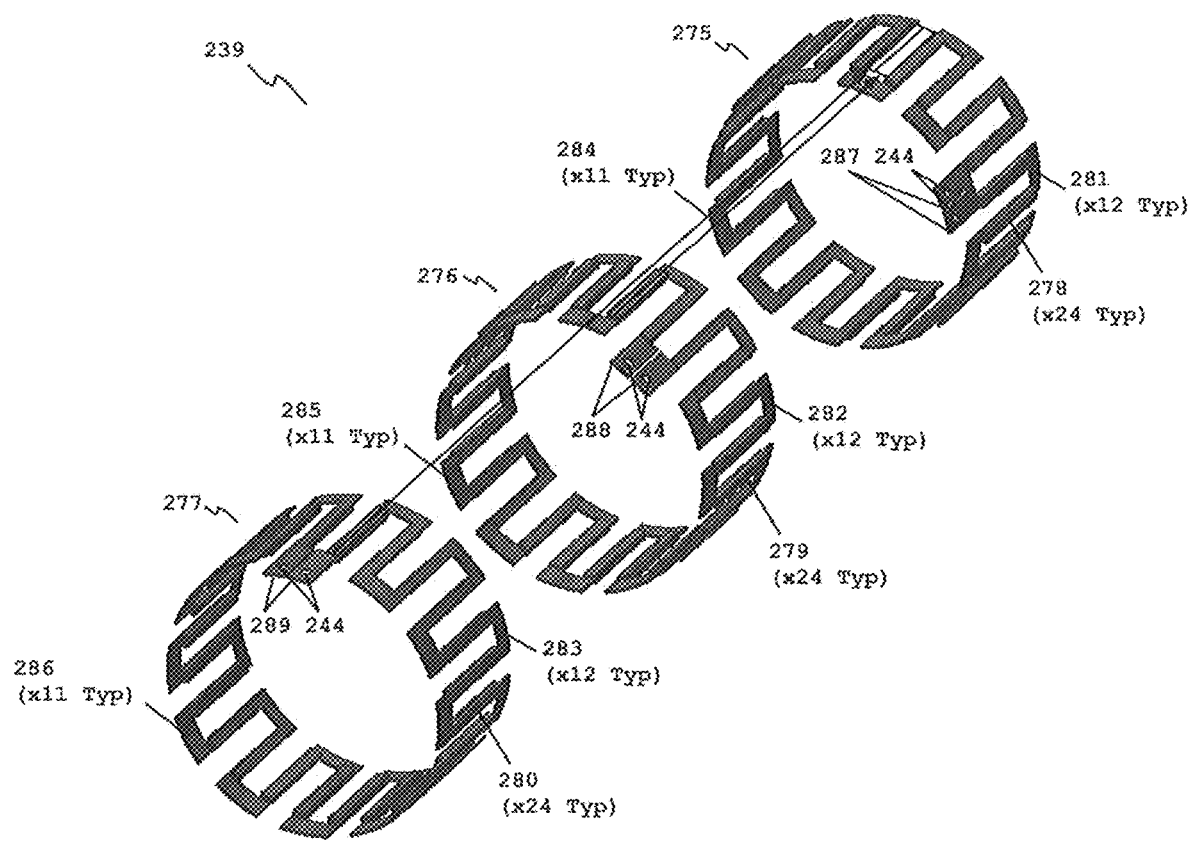

FIG. 12 is a schematic diagram that shows three conductors of the three-phase 24-pole motor of the preferred embodiment.

Figure 13:
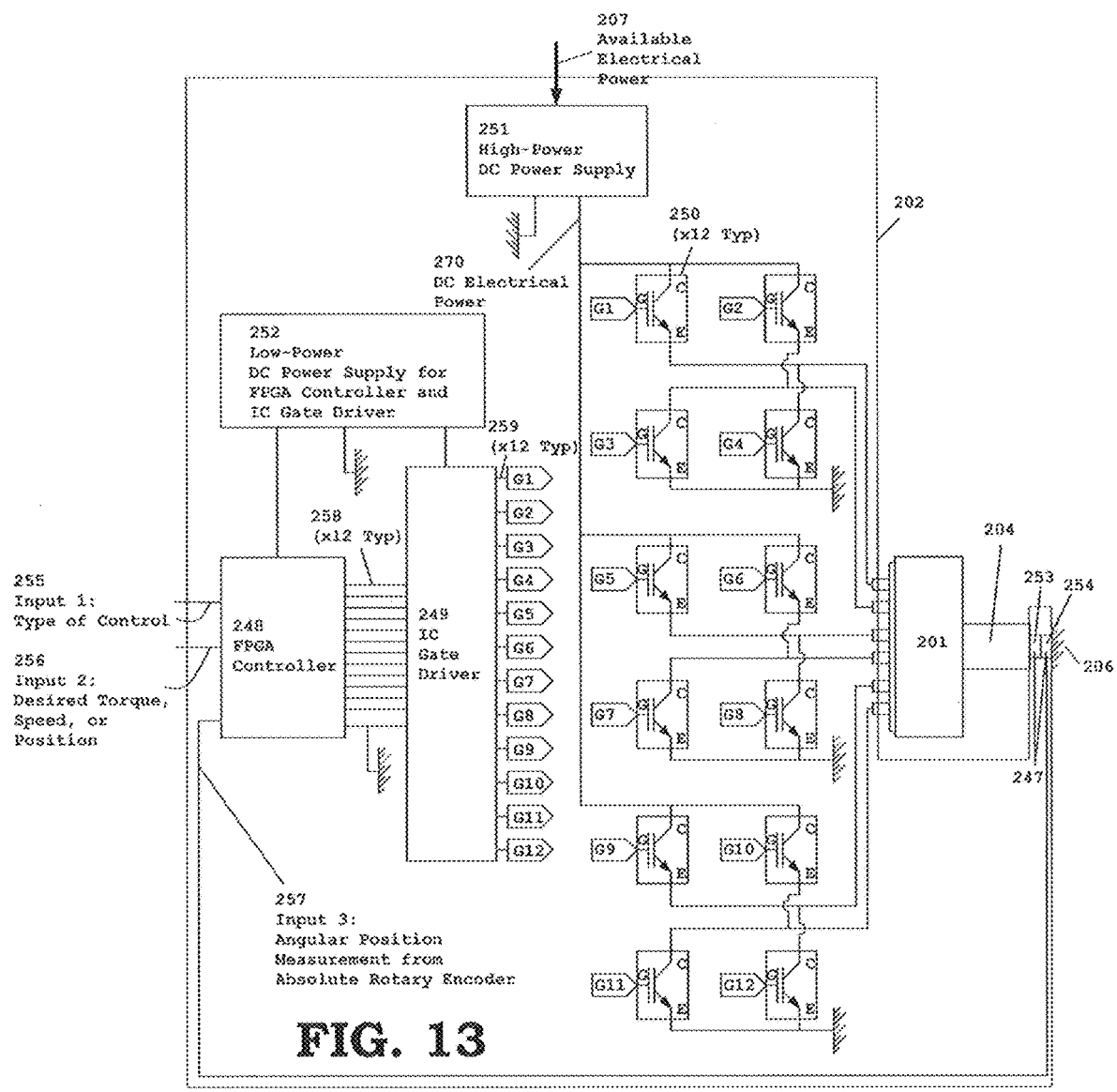

FIG. 13 is a schematic diagram that shows electronics of the three-phase 24-pole motor of the preferred embodiment.

Figure 14:
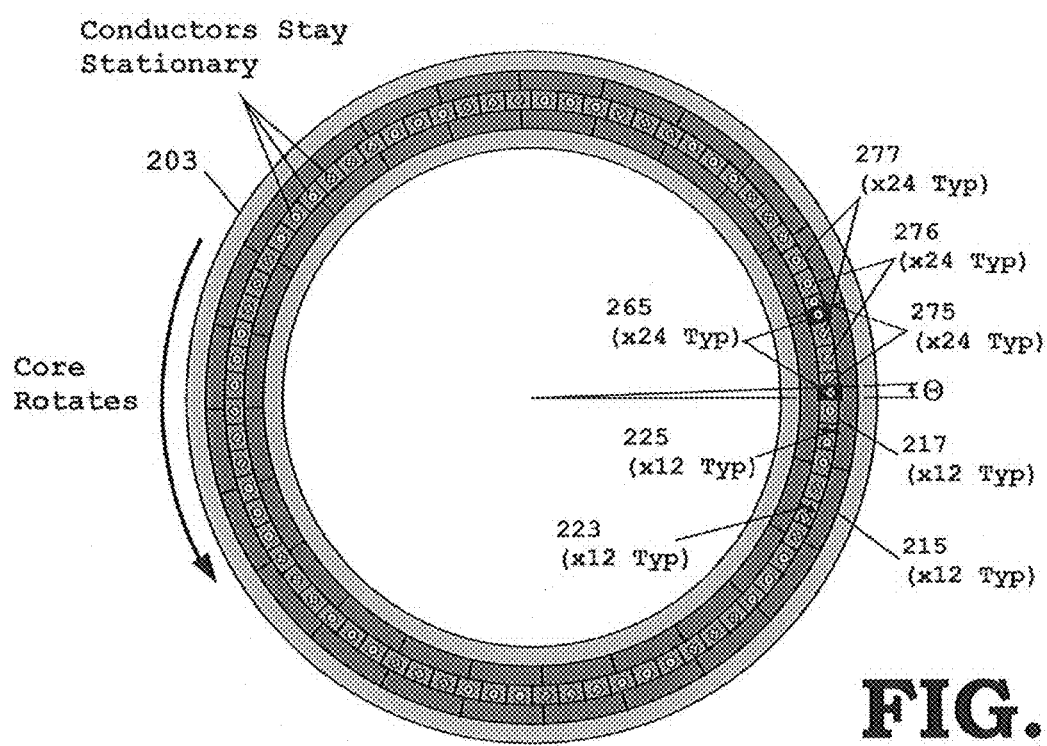

FIG. 14 is a schematic diagram that shows portions of one of the three conductors of the three-phase 24-pole motor of the preferred embodiment that produce restraining torques at full power.

Figure 15A:
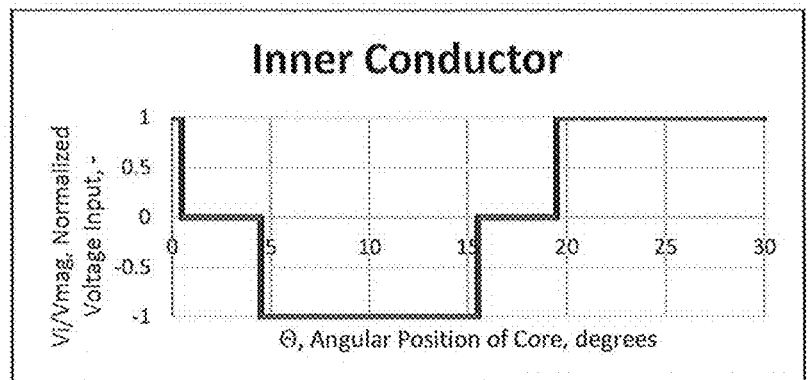

FIG. 15A is a schematic diagram that shows how the inner conductor of the three-phase 24-pole motor of the preferred embodiment is powered at low power.

Figure 15B:
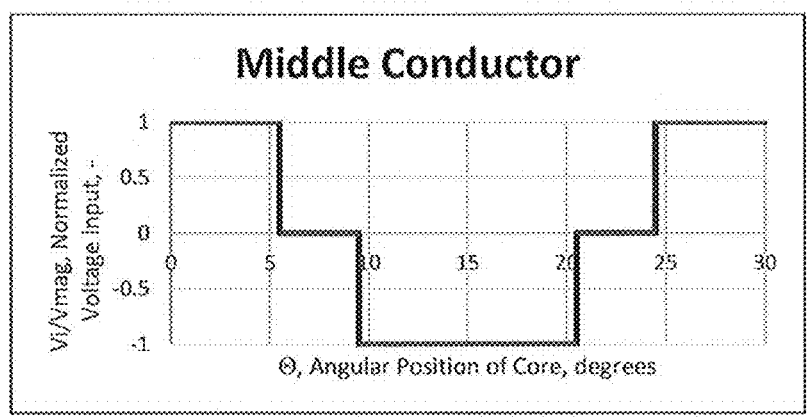

FIG. 15B is a schematic diagram that shows how the middle conductor of the three-phase 24-pole motor of the preferred embodiment is powered at low power.

Figure 15C:
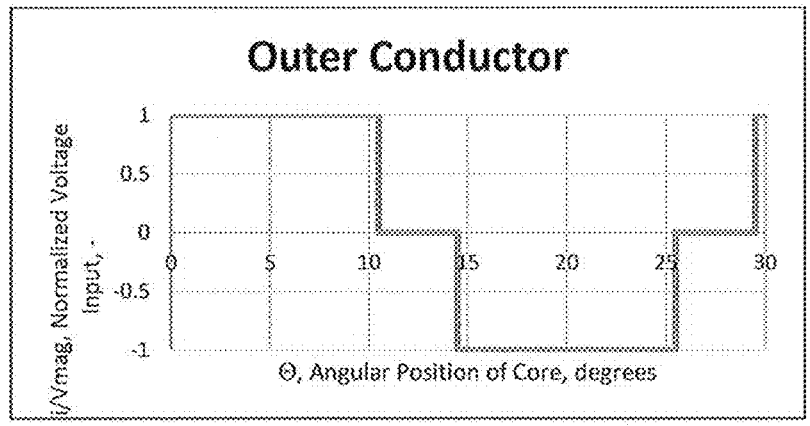

FIG. 15C is a schematic diagram that shows how the outer conductor of the three-phase 24-pole motor of the preferred embodiment is powered at low power.

Figure 15D:
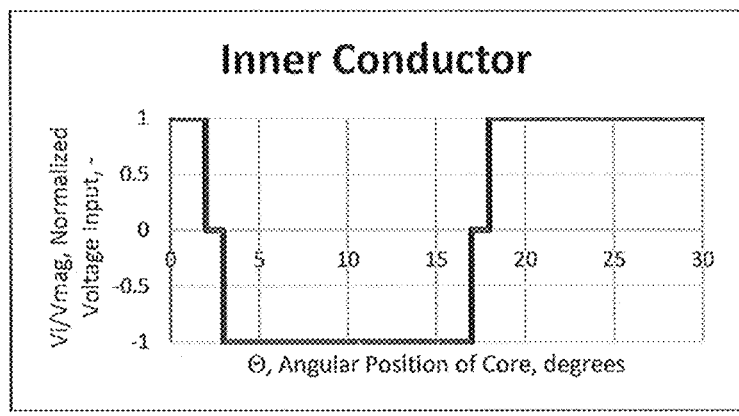

FIG. 15D is a schematic diagram that shows how the inner conductor of the three-phase 24-pole motor of the preferred embodiment is powered at moderate power.

Figure 15E:
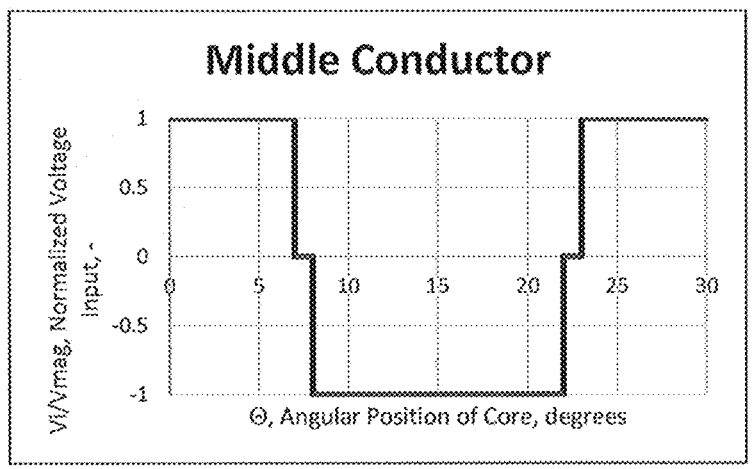
Figure 15F:
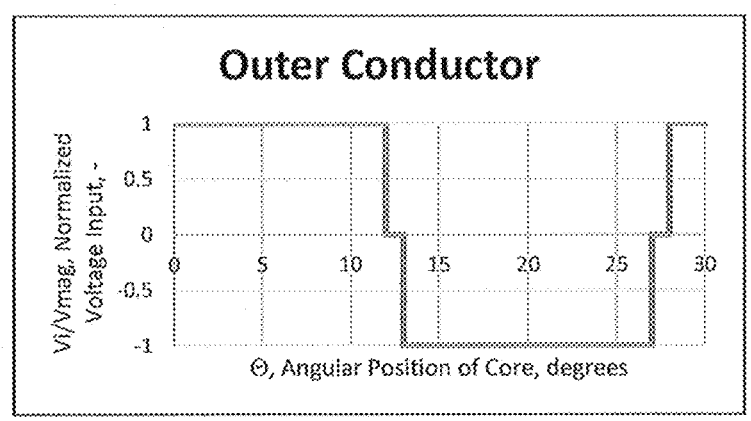

FIG. 15E is a schematic diagram that shows how the middle conductor of the three-phase 24-pole motor of the preferred embodiment is powered at moderate power, FIG. 15F is a schematic diagram that shows how the outer conductor of the three-phase 24-pole motor of the preferred embodiment is powered at moderate power.

FIG. 16 is a schematic diagram that shows a design of the invented motor with 70 hp of power output.

Figure 17A:
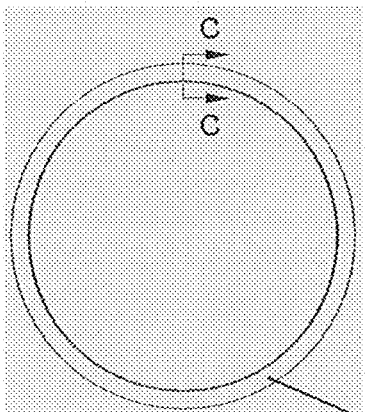

FIG. 17A is a front view of the core of a 3-phase 120-pole motor with axially oriented magnetic fields preferred embodiment.

Figure 17B:
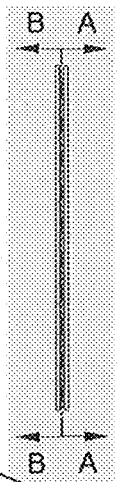

FIG. 17B is a right-hand side view of the core of a 3-phase 120-pole motor with axially oriented magnetic fields preferred embodiment.

Figure 17C:
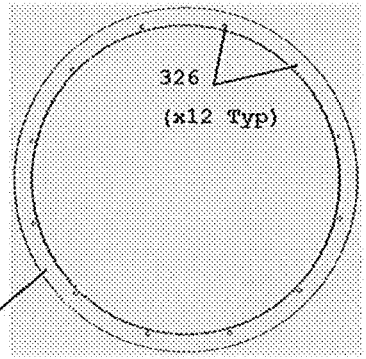

FIG. 17C is a rear view of the core of a 3-phase 120-pole motor with axially oriented magnetic fields preferred embodiment.

Figure 17D:
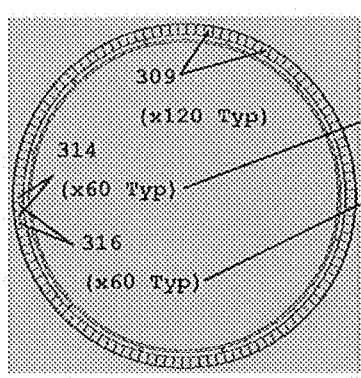

FIG. 17D is a cross-sectional view of a rear view of the core of a 3-phase 120-pole motor with axially oriented magnetic fields preferred embodiment.

Figure 17E:
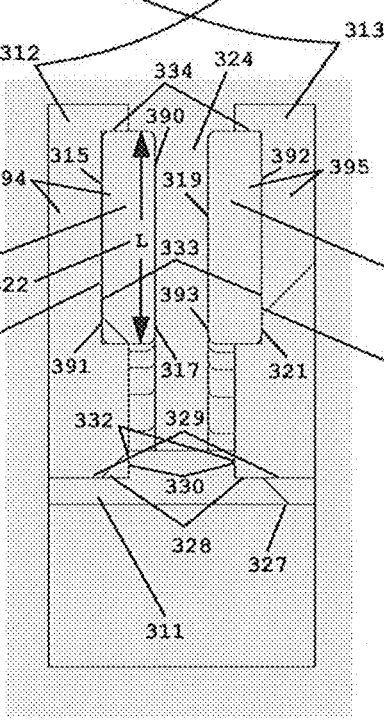

FIG. 17E is a cross-sectional view of a right-hand side view of the core of a 3-phase 120-pole motor with axially oriented magnetic fields preferred embodiment.

Figure 17F:
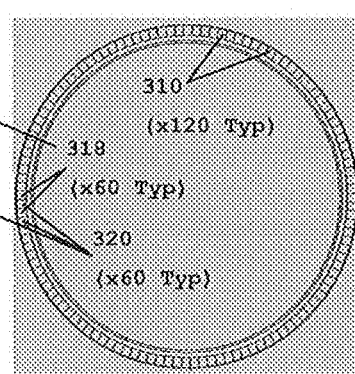

FIG. 17F is a cross-sectional view of a rear view of the core of a 3-phase 120-pole motor with axially oriented magnetic fields preferred embodiment.

Figure 18A:

FIG. 18A is a right-hand side view of the armature assembly of a 3-phase 120-pole motor with axially oriented magnetic fields preferred embodiment.

Figure 18B:
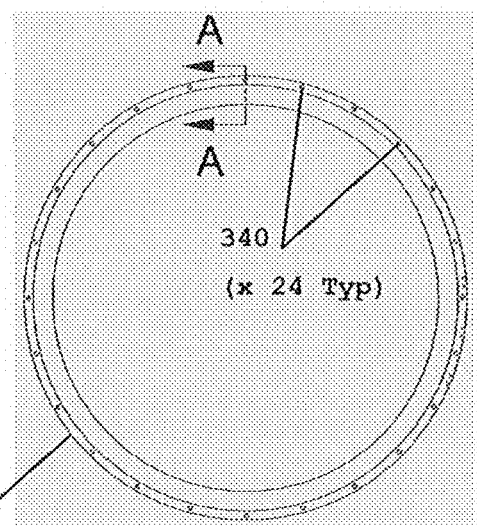

FIG. 18B is a rear view of the armature assembly of a 3-phase 120-pole motor with axially oriented magnetic fields preferred embodiment.

Figure 18C:
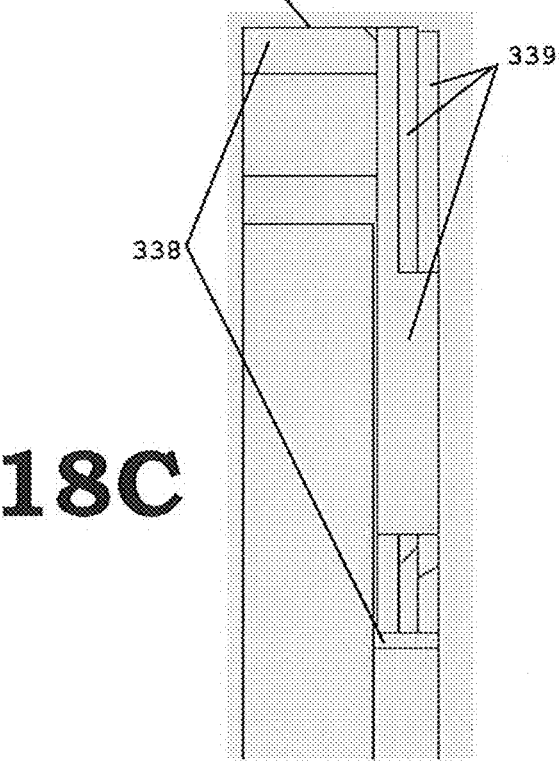

FIG. 18C is a cross-sectional view of a right-hand side view of the armature assembly of a 3-phase 120-pole motor with axially oriented magnetic fields preferred embodiment.

Figure 19:
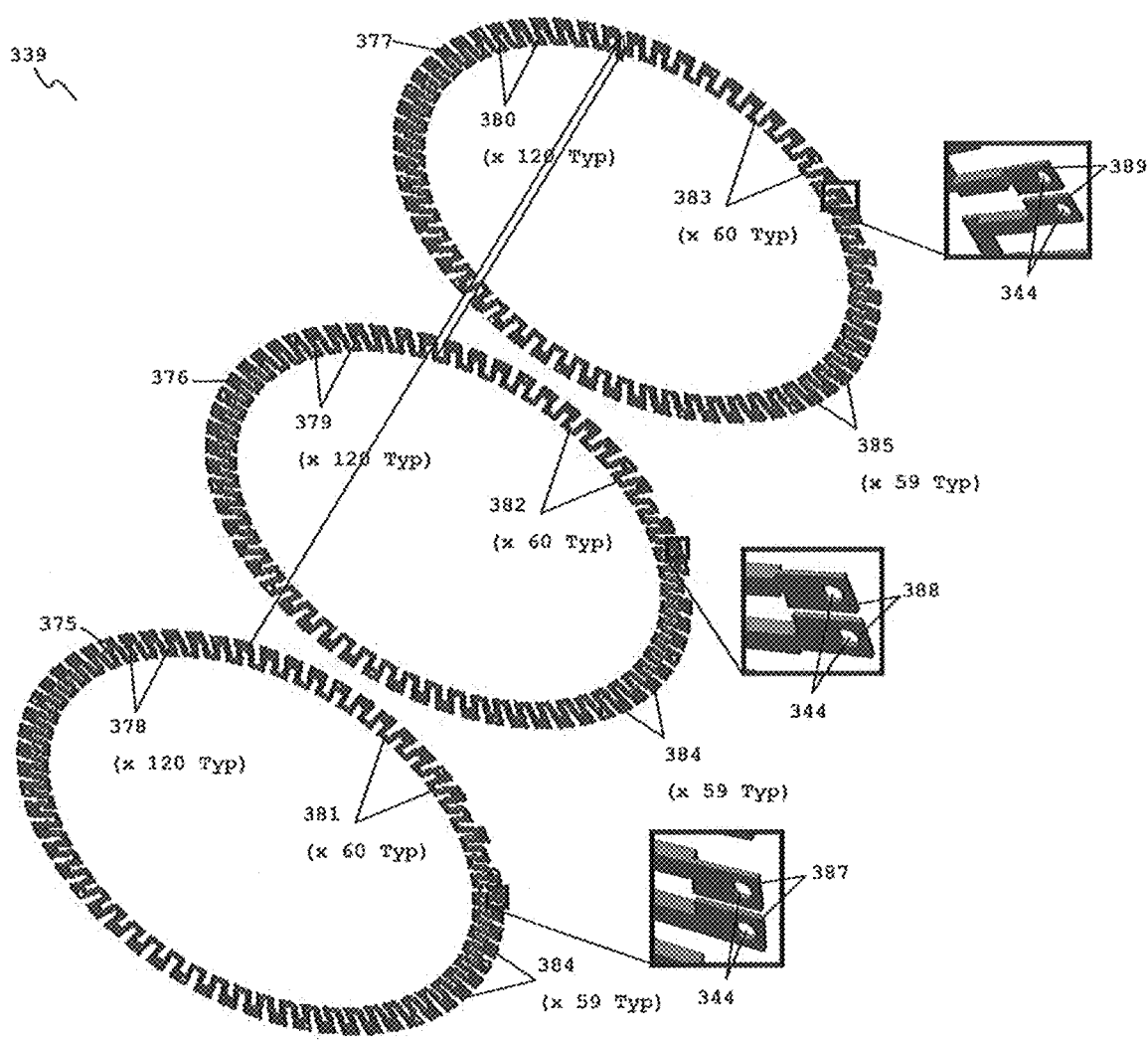

FIG. 19 shows the three conductors of a 3-phase 120-pole motor with axially oriented magnetic fields preferred embodiment.

Figure 20:
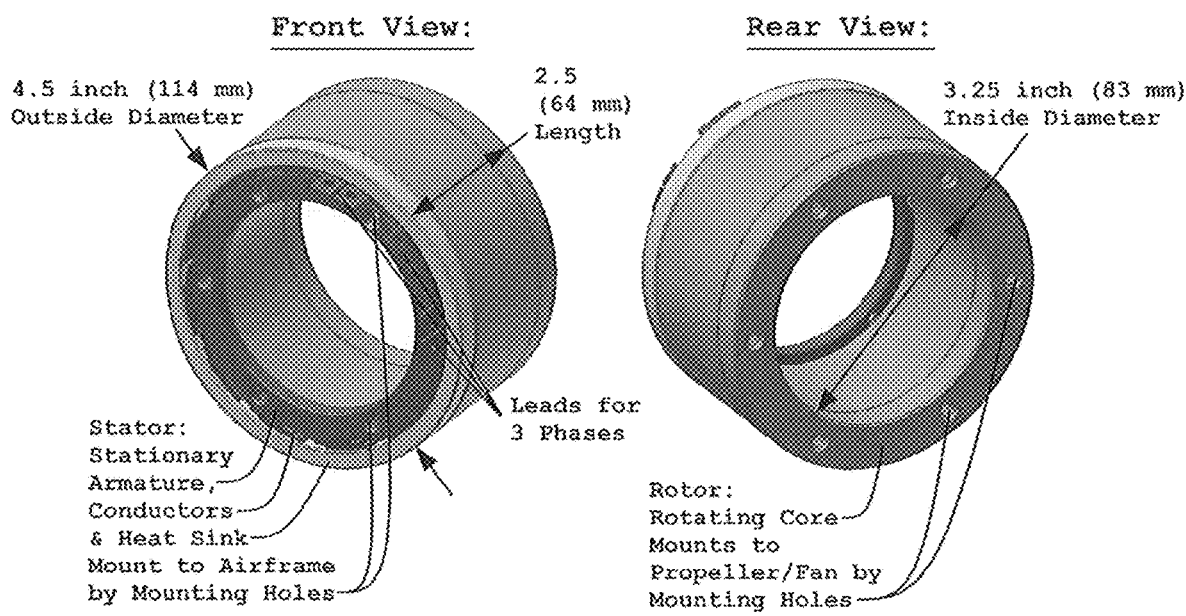

FIG. 20 is a schematic diagram that shows a design of the invented motor with 70 hp of power output.

FIG. 21 is a schematic diagram that shows a design of the invented motor with 200 hp of power output.

Figure 22:
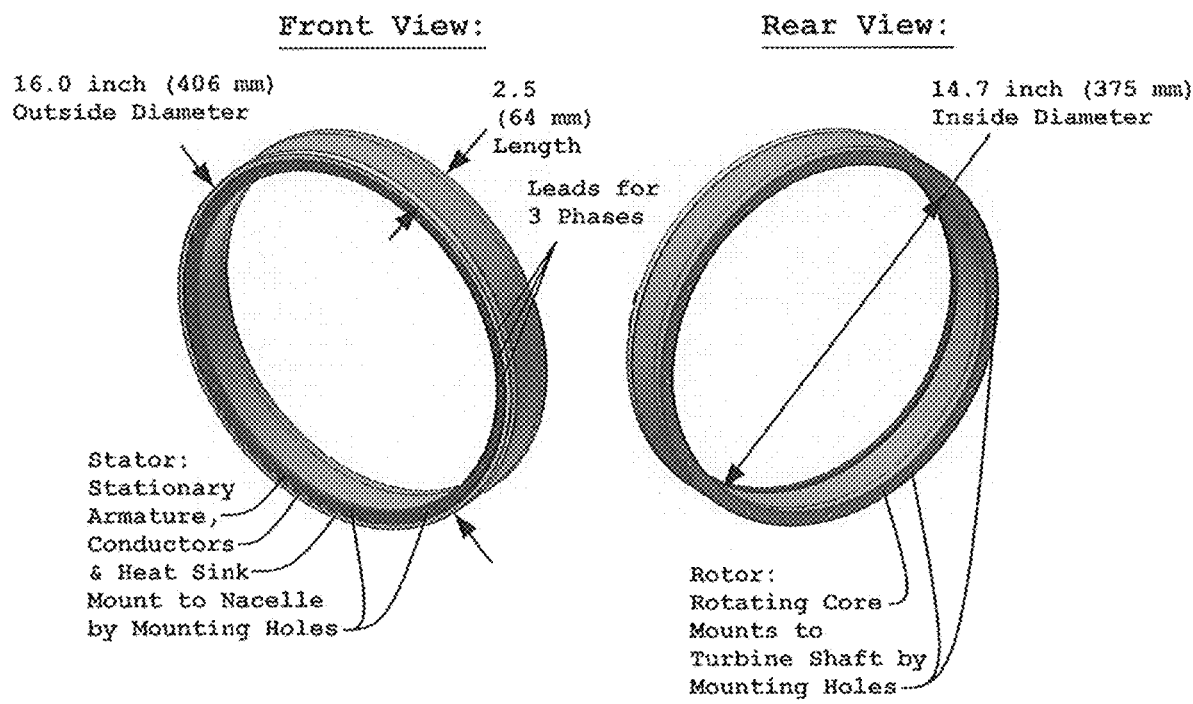

FIG. 22 is a schematic diagram that shows a design of the invented motor with 1 MW of power output.

Figure 23:
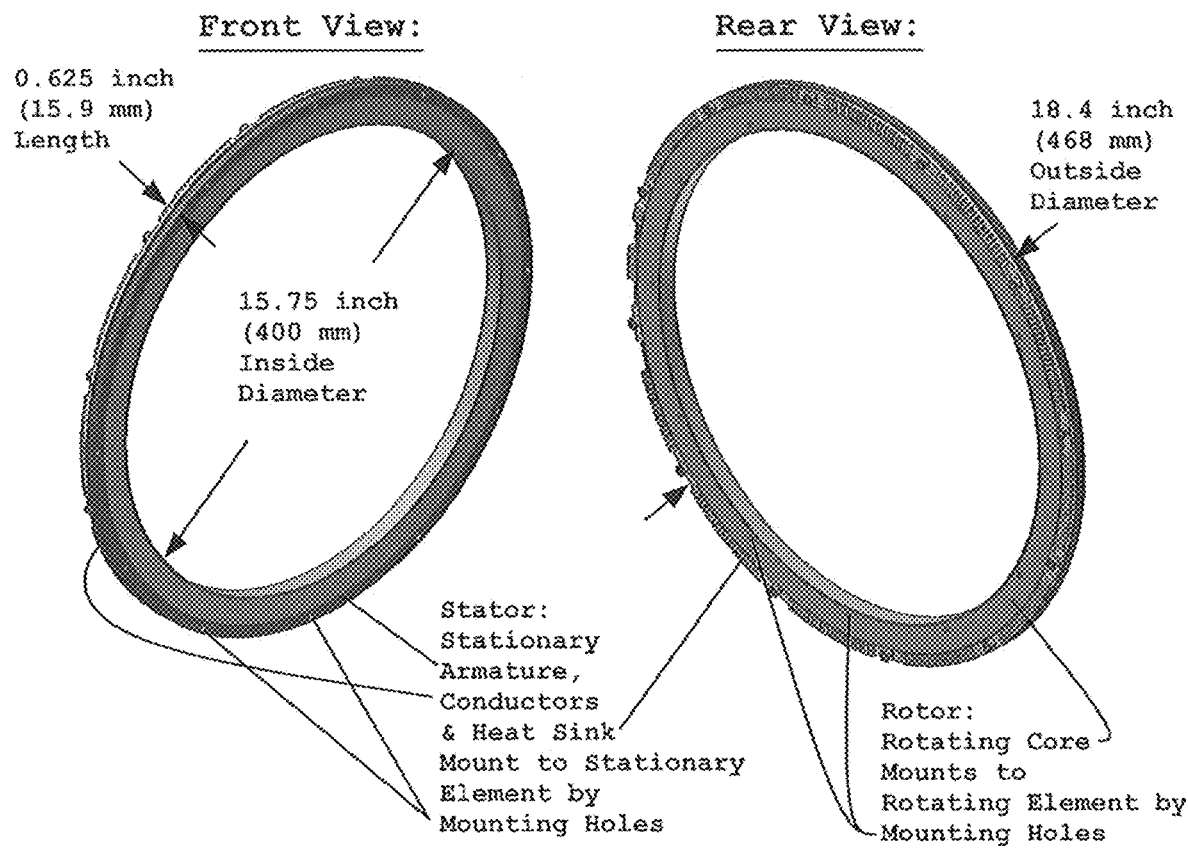

FIG. 23 is a schematic diagram that shows a design of the invented motor with 150 hp of power output.

Figure 24:
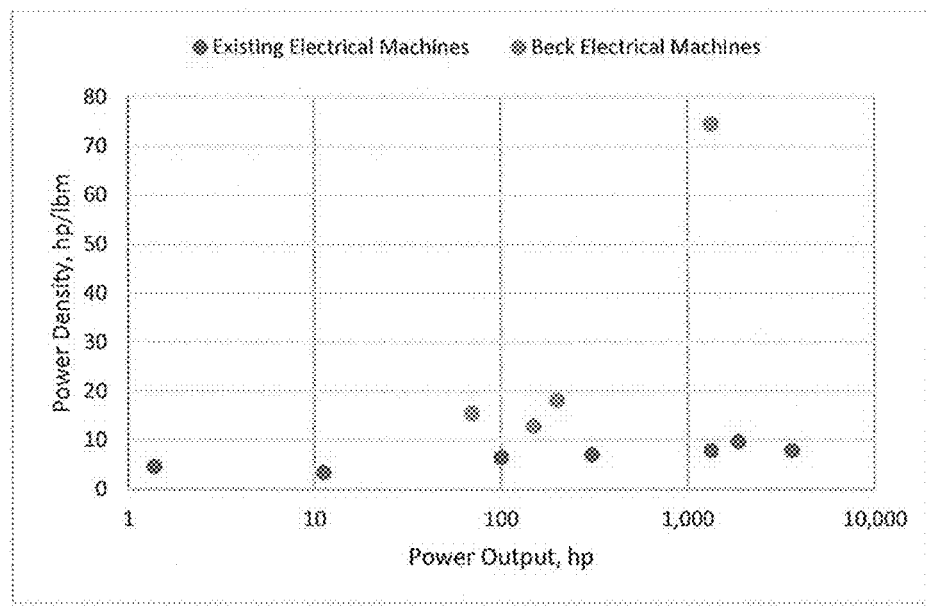

FIG. 24 is a plot that compares power-densities of current-art motors with the power-densities of designs of the invented motor.

Figure 25:
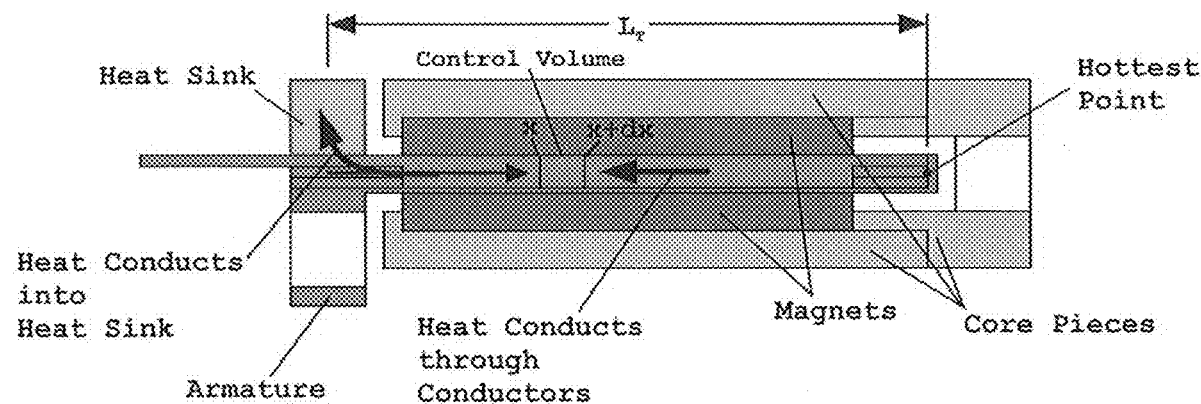

FIG. 25 is a schematic diagram that shows heat transfer in the invented motor.

Figure 26:
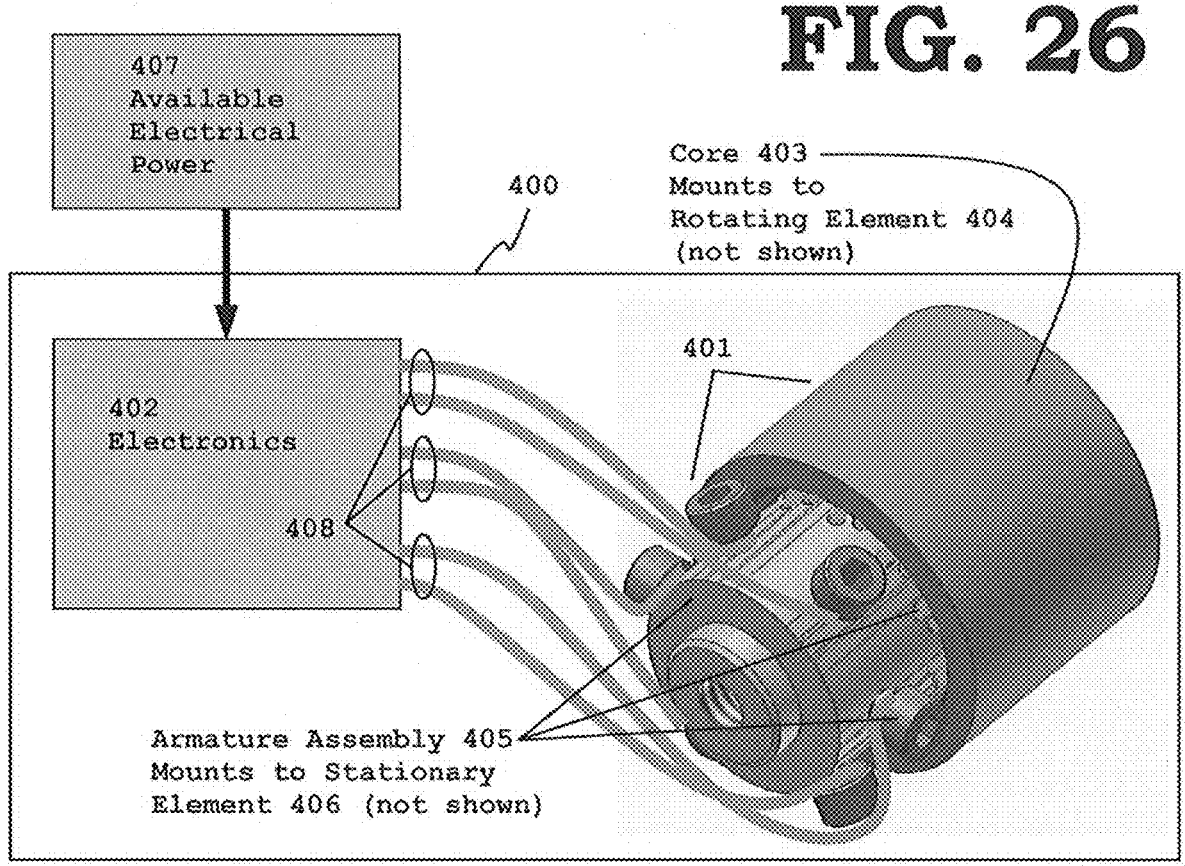

FIG. 26 is a schematic diagram that shows a proof-of-concept 3-phase 12-pole motor.

FIG. 27A is a front view that shows details of the core of a proof-of-concept 3-phase 12-pole motor.

FIG. 27B is a right-hand side view that shows details of the core of a proof-of-concept 3-phase 12-pole motor.

FIG. 27C is a rear view that shows details of the core of a proof-of-concept 3-phase 12-pole motor.

FIG. 27D is a cross-sectional view of a rear view of the core of a proof-of-concept 3-phase 12-pole motor.

FIG. 27E is a cross-sectional view of a left-hand side view of the core of a proof-of-concept 3-phase 12-pole motor.

Figure 28A:
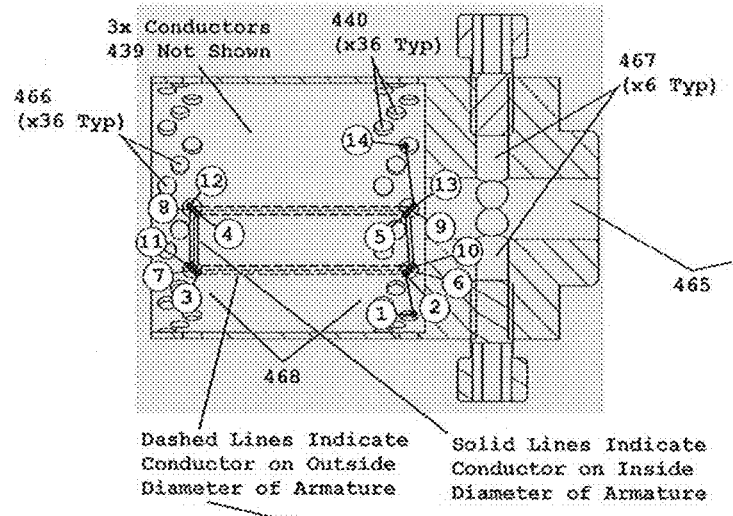

FIG. 28A is a cross-sectional view of a right-hand side view of the armature of a proof-of-concept 3-phase 12-pole motor.

Figure 28B:
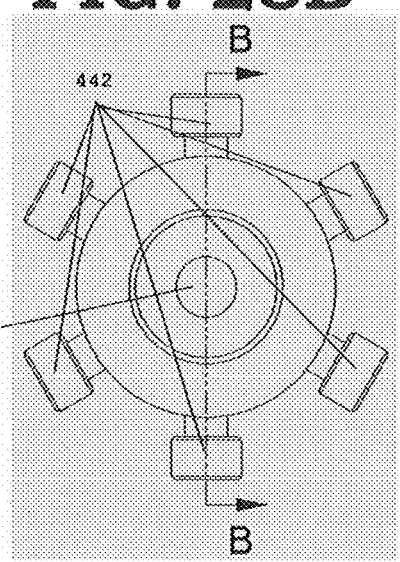

FIG. 28B is a rear view of the armature of a proof-of-concept 3-phase 12-pole motor.

Figure 28C:
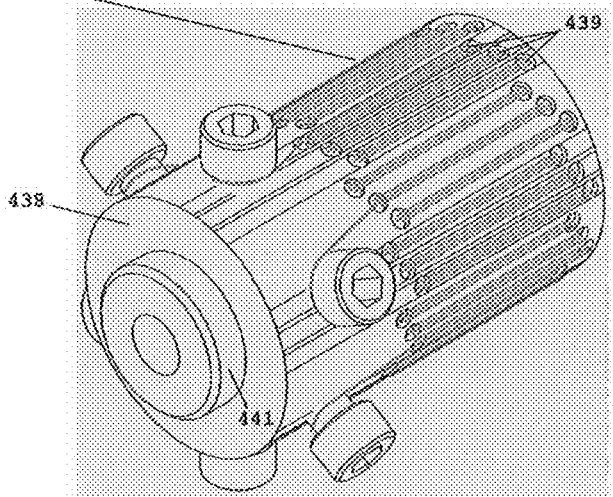

FIG. 28C is a pictorial view of the armature of a proof-of-concept 3-phase 12-pole motor.

Figure 29:
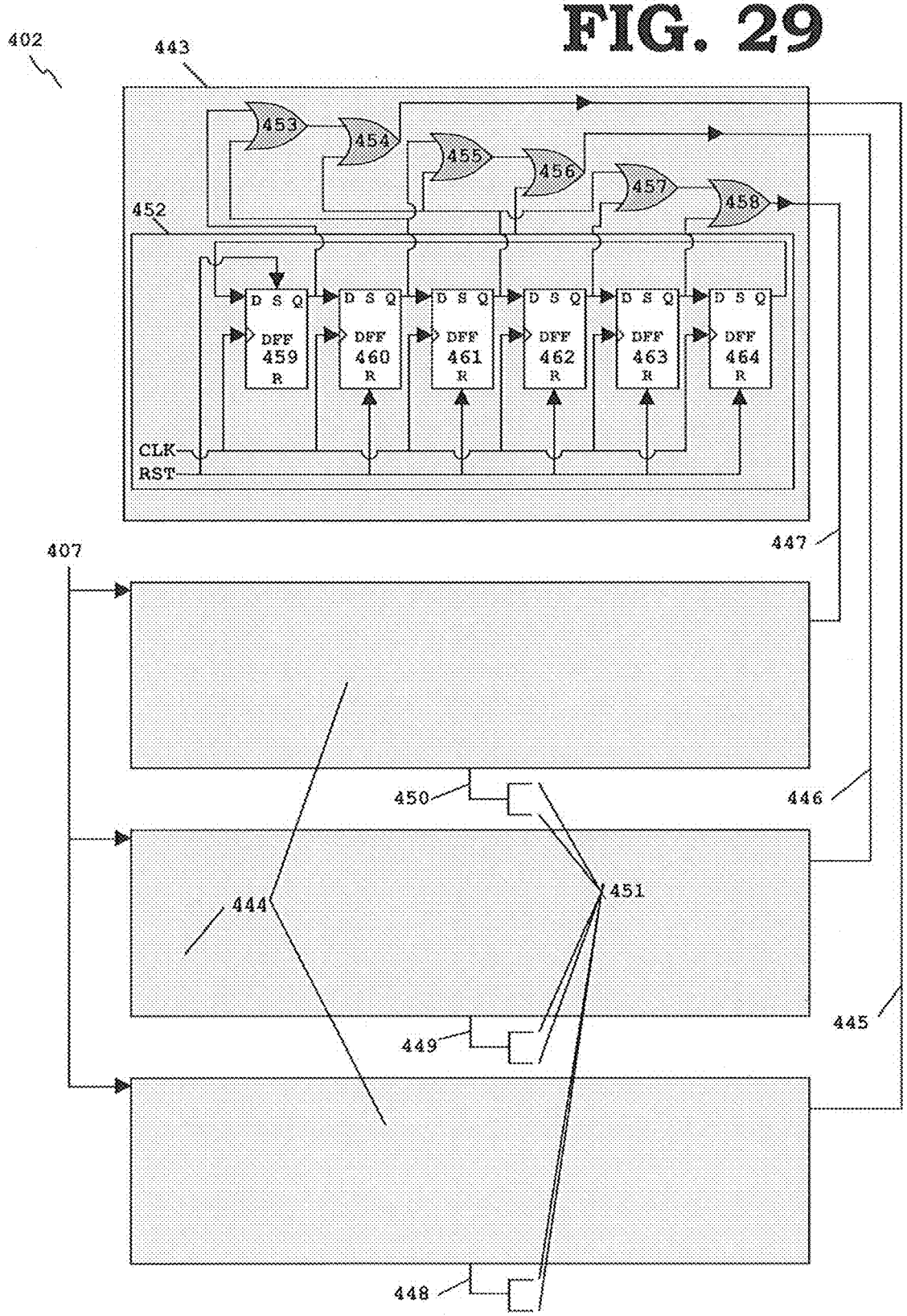

FIG. 29 is a schematic diagram that shows electronics of a proof-of-concept 3-phase 12-pole motor.

Figure 30A:
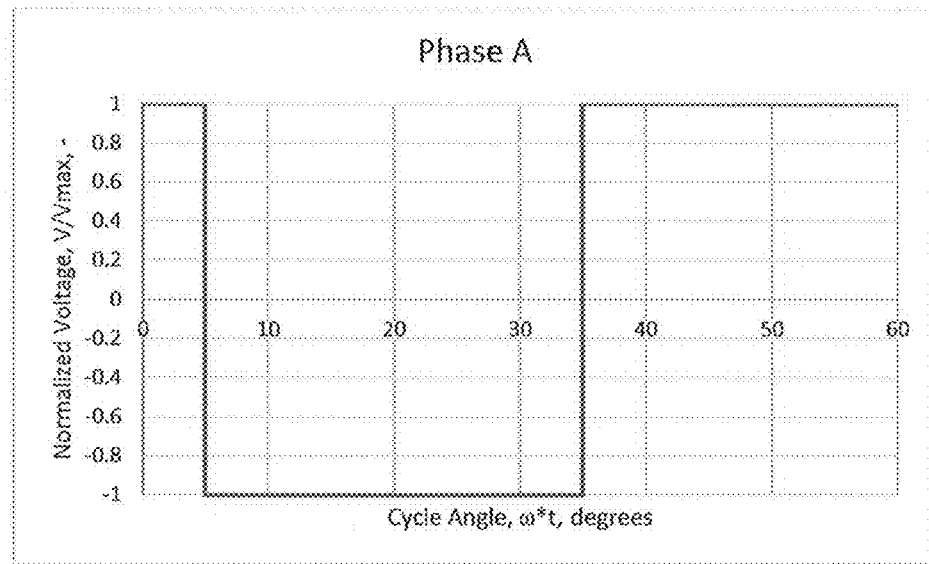

FIG. 30A is a plot of the normalized voltage input to the Phase-A conductor of a proof-of-concept 3-phase 12-pole motor.

Figure 30B:
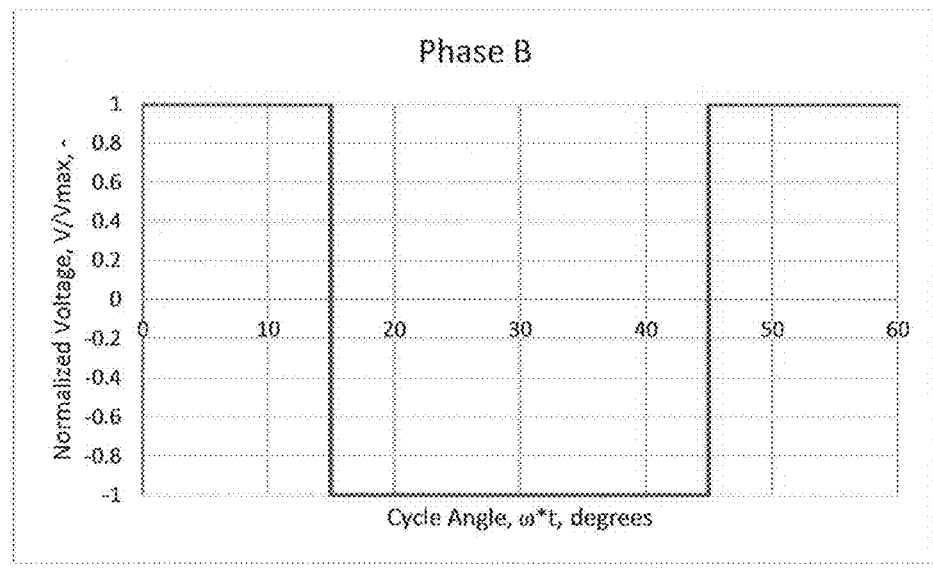

FIG. 30B is a plot of the normalized voltage input to the Phase-B conductor of a proof-of-concept 3-phase 12-pole motor.

Figure 30C:
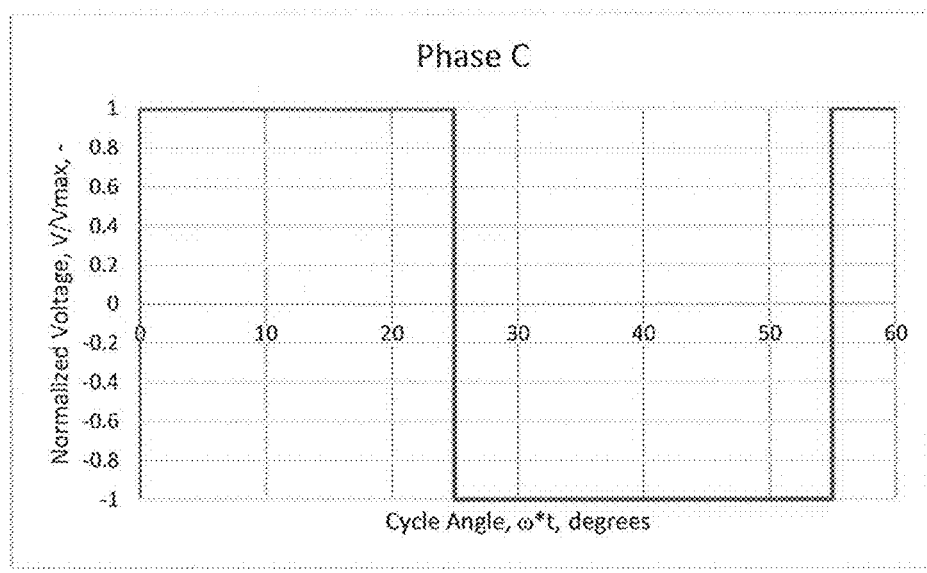

FIG. 30C is a plot of the normalized voltage input to the Phase-C conductor of a proof-of-concept 3-phase 12-pole motor.

BRIEF DESCRIPTION OF THE TABLES

TAB. 1 is a table that lists specifications and calculated performance parameters for three embodiments of the invention.

TAB. 2 compares power-densities of current-art motors with power-densities of designs of the invented motor.

TAB. 3 lists data for the magnets of a proof-of-concept 3-phase 12-pole motor.

Preferred Embodiment of the Invention

A Single-Phase Two-Pole Motor

A single-phase two-pole design of our motor is a preferred mode for implementing the invention for applications for which only single-phase electrical power is available, including home appliances, and for miniature low-power applications for which simplicity is important. FIG. 1 shows a single-phase two-pole design of the motor 100. The motor 100 is comprised of: a mechanical motor/generator assembly 101 and optional electronics 102. The mechanical motor/generator assembly 101 is comprised of: a core 103, which is attached to, and rotates with, a rotating element 104; and an armature assembly 105, which is mounted to, and stays stationary with, a stationary element 106. Examples of possible rotating elements include: shafts in home appliances and shafts of turbo-machines in reverse-Brayton cryogenic refrigerators. Examples of possible stationary elements include: structures of home appliances and housings of turbo-machines in reverse-Brayton cryogenic refrigerators. The optional electronics 102 convert available electrical power 107 into a Pulse Width Modulated (PWM) voltage, which is applied across leads 108 to the mechanical motor/generator assembly 101 and drives the mechanical motor/generator assembly 101. The mechanical motor/generator assembly 101 can operate without the optional electronics 102 for situations in which: available electrical power 107 is suitable for driving the mechanical motor/generator assembly 101 as a motor (for example, when single-phase Alternating Current (AC) electrical power is available; and/or the available power has been produced by a separate mechanical motor/generator assembly 101 of the present invention, operating as a generator); or the electrical power produced by the mechanical motor/generator assembly 101, as a generator, is useable (for example, for driving a separate mechanical motor/generator assembly 101 of the present invention, as a motor).

FIGS. 2A-2E show details of the core 103. The core 103 is comprised of: an outer magnet assembly 194; an inner magnet assembly 195; and a base pole piece 111. The outer magnet assembly 194 and the inner magnet assembly 195 are mounted to the base pole piece 111, which maintains concentricity between the outer magnet assembly 194 and the inner magnet assembly 195 to define an annular air gap 124 between the outer magnet assembly 194 and the inner magnet assembly 195. The outer magnet assembly 194 is comprised of: two outer 180-degree arc-segment neodymium-iron-boron (NdFeB) rare-earth permanent magnets of grade 52H (also known as N52H magnets) 109; and an outer pole piece 113. The inner magnet assembly 195 is comprised of: two inner 180-degree arc-segment N52H magnets 110; and an inner pole piece 112. The two outer 180-degree arc-segment magnets 109 are comprised of: an outer outward magnet 114, which has its north pole 115 at its outer radius and is located at the top of the core 103 at the instant shown in FIGS. 2A-2E; and an outer inward magnet 116, which has its north pole 117 at its inner radius and is located at the bottom of the core 103 at the instant shown in FIGS. 2A-2E. The two inner magnets 110 are comprised of: an inner outward magnet 118, which has its north pole 119 at its outer radius and is located at the top of the core 103 at the instant shown in FIGS. 2A-2E; and an inner inward magnet 120, which has its north pole 121 at its inner radius and is located at the bottom of the core 103 at the instant shown in FIGS. 2A-2E. The two outer magnets 109 and the two inner magnets 110 all have equal axial lengths, L 122. The two outer magnets 109 and the two inner magnets 110 are configured concentrically and with the relative angular positions (also known as "timing") shown in FIGS. 2A-2E, to produce a time-invariant radially-outward magnetic field 123 through an annular air gap 124 at the top of the core 103 and a time-invariant radially-inward magnetic field 125 through the annular air gap 124 at the bottom of the core 103, at the instant shown in FIGS. 2A-2E.

The base pole piece 111, has a bolt circle of six axial drilled, countersunk, and tapped through mounting holes 126 in the base pole piece 111. The mounting holes 126 and the inside diameter 127 of the base pole piece 111 are used to mount the core 103 to the rotating element 104, as FIG. 1 shows. A tight radial clearance between the inside diameter 127 of the base pole piece 111 and the mating outside diameter of the rotating element 104 (for example, a radial clearance of less than 0.001 inch) ensures good balance and minimizes vibrations during operation of the motor 100. The base pole piece 111 includes an inner increased diameter 128 over which the outside diameter 129 of the inner pole piece 112 slides concentrically during assembly, with a tight gap between the inner increased diameter 128 and the outside diameter 129 (for example, a radial gap of less than 0.001 inch), for accurate concentric alignment for good balance during rotation of the core 103. The base pole piece 111 includes an inner shoulder 130 against which the back face 131 of the inner pole piece 112 mates during assembly. The base pole piece 111 includes an outer reduced diameter 132 over which the inside diameter 133 of the outer pole piece 113 slides concentrically during assembly, with the tight gap between the outer reduced diameter 132 and the inside diameter 133 (for example, a radial gap of less than 0.001 inch), for accurate concentric alignment for good balance during rotation of the core 103. The base pole piece 111 includes an outer shoulder 134 against which the back face 135 of the outer pole piece 111 mates during assembly. The inner pole piece 112 has a magnet retainer 136, which is an area of increased diameter and is used to restrain axial movement of the inner magnets 110 after assembly. The outer pole piece 113 has a magnet retainer 137, which is an area of reduced diameter and is used to restrain axial movement of the outer magnets 109 after assembly.

Figure 3A:
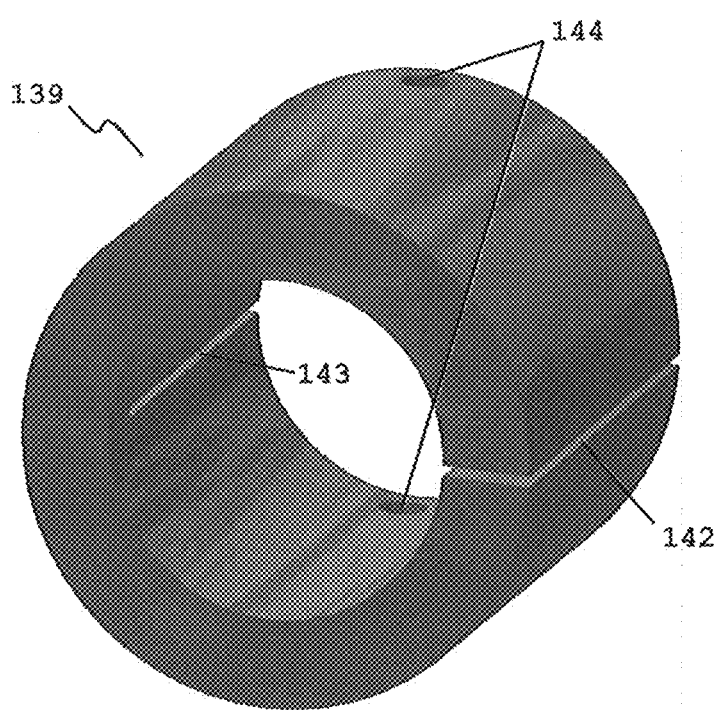
FIG. 3A is a schematic diagram that shows details of the conductor of a single-phase two-pole motor preferred embodiment.

The armature assembly 105 consists of: an armature 138, and a conductor 139. The armature 138 is made from titanium alloy 6Al-4V, or an alternative material that is electrically insulating and has strong mechanical properties, including a high yield strength. The armature 138 has a bolt circle of six drilled, countersunk, and tapped through mounting holes 140. The mounting holes 140 and the inside diameter 141 of the armature 138 are used to mount the armature assembly 105 to the stationary element 106. A tight radial clearance between the inside diameter 141 of the armature 138 and the outside diameter of the stationary element 106 (for example, a radial clearance of less than 0.001 inch) ensures good balance and minimizes vibrations during operation of the motor 100. FIG. 3A shows the conductor 139. The conductor 139 is made from copper alloy 101, or an alternative material with a high electrical conductivity and a high thermal conductivity. The conductor 139 is a hollow cylinder with two slits located diametrically opposed to one another: a full slit 142, and a partial slit 143. The conductor 139 has two radial mounting holes 144 for two electrical leads 108 (FIG. 1 shows the electrical leads 108). At the instant shown in FIGS. 2A-2E, the electronics apply a positive voltage across the conductor 139, so current flows through the conductor 139 as shown in FIGS. 2A-2E, with positive current flowing into the page of FIGS. 2A-2E 145 at the top of the conductor 139 and out of the page of FIGS. 2A-2E 146 at the bottom of the conductor 139. The conductor 139 is coated with a thin layer of insulating material (sometimes called "insulating varnish") and bonded to the armature 138 with an adhesive, so the conductor 139 can transmit torque to or from the armature 138.

Figure 3B:
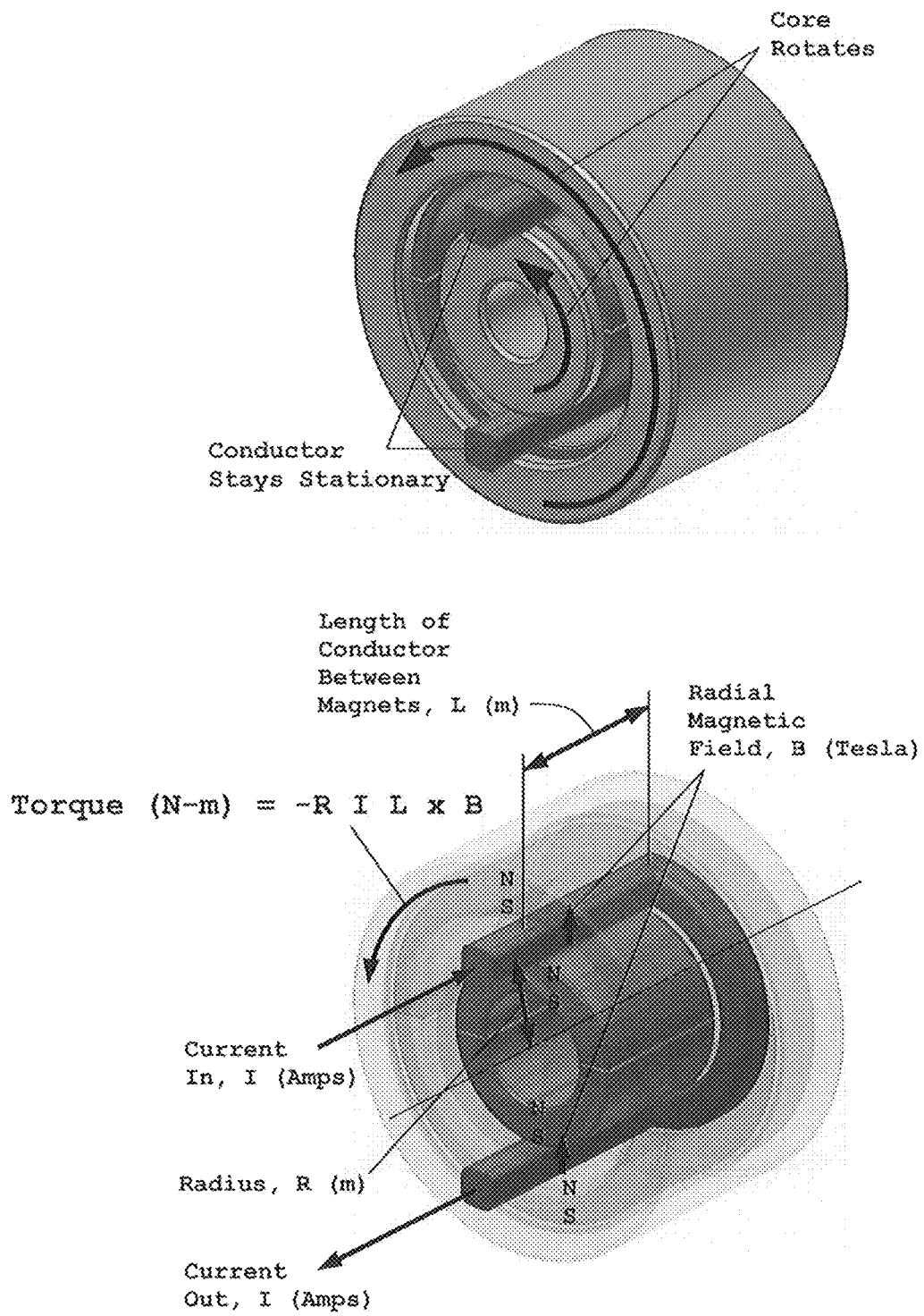
FIG. 3B is a schematic diagrams that show details of a single-phase two-pole motor of a preferred embodiment.

FIG. 3B shows an alternative embodiment of a single-phase tow-pole motor of the invention. The conductor 339 of the embodiment shown in FIG. 3B occupies only a small fraction of the total volume of the air gap 324, so the conductor does not fully utilize the volume of the air gap 324; however, the embodiment shown in FIG. 3B illustrates the principle of operation of the invention.

FIG. 4 shows the optional electronics 102, which include: an absolute rotary encoder 147; a Field Programmable Gate Array (FPGA) controller 148; an Integrated Circuit (IC) gate driver 149; four Insulated Gate Bipolar Transistors (IGBTs) 150; a high-power Direct Current (DC) power supply 151; and a low-power DC power supply 152 for the FPGA controller 148 and the IC gate driver 149. The electronics 102 have a similar configuration to electronics that are used with existing Alternating Current (AC) motors; however, the electronics of the present invention use a control scheme to control our motor 100 that is fundamentally different than control schemes of existing motors. One end of the encoder 153 mounts to the rotating element 104, and the other end of the encoder 154 mounts to the stationary element 106. The encoder 147 measures the angular position of the core 103. The FPGA controller 148 reads three inputs: (1) an input 155 that specifies whether the FPGA controller 148 uses torque control, speed control, or position control; (2) an input 156 that specifies the desired torque or rotational speed; and (3) the output 157 of the encoder 147. The FPGA controller 148 uses a computational control scheme (for example, Proportional+Integral+Derivative, PID, control) to calculate appropriate times to fire each of the four IGBTs 150, and outputs four digital signals 158 to the IC gate driver 149. The four digital signals 158 are commands for firing (or not firing) each of the four IGBTs 150. The IC gate driver 149 reads the four digital signals 158 from the FPGA controller 148, executes safeguards, and outputs four digital signals 159 to the four IGBTs 150. The IC gate driver 149 also electrically isolates the outputs 159 from the inputs 158 (using opto-isolators, for example). When the IGBTs 150 are fired appropriately, current can flow through the IGBT 150, in either direction, from (or to) the high-power Direct Current (DC) power supply 151 to (or from) the mechanical motor/generator assembly 101. The high-power DC power supply 151 converts available electrical power 107 (for example, AC or DC electrical power) into DC electrical power 170 that is suitable for driving the motor 100.

The four IGBTs 150 form a full H-bridge circuit 160. FIGS. 5A-5C show how the full H-Bridge circuit 160 works. When IGBT A1 161 and IGBT A2 162 are fired, a positive voltage is applied across the leads to the conductor 139, so a positive current 171 flows through the conductor 139 (as shown in FIG. 5A). When IGBT A3 163 and IGBT A4 164 are fired, a negative voltage is applied across the leads to the conductor 139, so a negative current 172 flows through the conductor 139 (as shown in FIG. 5B). When neither IGTB A1 161, IGBT A2 162, IGBT A3 163, nor IGBT A4 164 are fired, zero voltage is applied across the leads to the conductor 139, so zero current 173 flows through the conductor 139 (as shown in FIG. 5C).

FIGS. 6A and 6B show how the control scheme in the FPGA controller 148 fires the IGBTs 150 of the full H-Bridge circuit 160 at full power, depending on the angular position, Θ, of the core 103, to produce positive or negative voltages across the conductor 139, and resulting positive or negative currents through the conductor 139. FIG. 6A is a cross-sectional view of the core 103 and the armature assembly 105, when the core 103 is at an angular position, Θ. FIG. 6B plots the normalized voltage input (voltage input divided by the maximum voltage input) to the conductor 139 and the torque-generation efficiency, $\eta_T$. Torque-generation efficiency is defined as the torque on the core, divided by the ideal torque that would be produced if all the conductors produced torque in the desired direction of rotation:

$$\eta_T = \frac{\tau}{\tau_I} \tag{2}$$

where, $\eta_T$=Torque-generation efficiency, –;
τ=Torque, N; and
$\tau_I$=Ideal torque, N.

When the core 103 has the angular position, Θ, shown in FIG. 6A, two portions 165 of the conductor 139 produce positive (clockwise) torque on the core 103, and the rest of the conductor 139 produces negative (counterclockwise) torque on the core 103. The net torque on the core 103 is less than if all of the conductor 139 produced negative torque. When the angular position of the core 103 has values Θ=0° and Θ=180°, all of the conductor 139 produces negative torque, so the torque-generation efficiency is $\eta_T$=1. When the angular position of the core 103 has values Θ=90° and Θ=270°, one half of the conductor 139 produces positive torque and one half of the conductor 139 produces negative torque with an equal magnitude, so the net torque on the core 103 is zero, and the torque-generation efficiency is $\eta_T$=0. For intermediate angular positions of the core 103, the torque-generation efficiency is a linear function of the angular position, Θ, of the core 103. The integrated average of the torque-generation efficiency over a frill cycle, at full power, is $\overline{\eta}_T$=0.5.

FIGS. 7A and 7B show how the control scheme in the FPGA controller 148 fires the IGBTs 150 of the full H-Bridge circuit 160 at part power, depending on the angular position, Θ, of the core 103, to produce positive, negative, or zero voltages across the conductor 139, and resulting positive, negative, or zero currents through the conductor 139, and to maximize the torque-generation efficiency of the motor 100 at all power levels. For very small power levels, the FPGA controller 148 fires the IGBTs 150 only when the core is near angular positions Θ≈0° and Θ≈180°, so the torque-generation efficiency is near one: $\eta_T$≈1 (as shown in FIG. 7A). As the power level is increased, the FPGA controller 148 increases the widths of the pulses, to include angular positions of the core, Θ, for which the torque-generation efficiency is increasingly smaller (as shown in FIG. 7B). The integrated average of the torque-generation efficiency over a full cycle, at part power, varies linearly from one (near zero power) to the full-power value of $\overline{\eta}_T$=0.5. The integrated average of the torque-generation efficiency, as a function of fractional power input, f, is:
For a single-phase one-pole motor:

$$\overline{\eta}_T = 1 - \frac{f}{2} \qquad (3)$$

For torque control, the FPGA controller 148 adjusts the fractional power input, f, and uses EQN. 3 to achieve the input desired torque 156. For speed control and position control, the FPGA controller 148 uses a computational control scheme (for example, Proportional+Integral+Derivative, PID, control) to calculate the fractional power input, f, that is required to reach the input desired rotational speed or position 156, and uses EQN. 3 to achieve the desired rotational speed or position 156.

FIG. 8 is a cross-sectional schematic diagram of the mechanical motor/generator assembly 101, which shows how the mechanical motor/generator assembly 101 rejects waste heat. The mechanical motor/generator assembly 101 produces waste heat through Joule heating (sometimes called "i²R" loss). The conductor 139 has an approximately constant cross-sectional area in the direction of flow of electrical current, so the conductor 139 produces Joule heating approximately uniformly through the volume of the conductor 139. The produced heat conducts 174 through the conductor 139 to the external portion 166 of the conductor 139. A finned heat exchanger 167 rejects the heat to the ambient environment 168, through forced-convection heat transfer or natural-convection heat transfer.

Preferred Embodiment of the Invention

A Three-Phase 24-Pole Motor

A three-phase 24-pole design of our motor is a preferred mode for implementing the invention for applications that require power outputs of 70 hp and roughly similar power outputs. FIG. 9 shows a three-phase 24-pole design of our motor 200. The motor 200 is comprised of: a mechanical motor/generator assembly 201 and optional electronics 202. The mechanical motor/generator assembly 201 is comprised of: a core 203, which is attached to, and rotates with, a rotating element 204; and an armature assembly 205, which is mounted to, and stays stationary with, a stationary element 206. Examples of possible rotating elements include: propeller shafts of underwater vehicles, surface ships, and aircraft; shafts of gas-turbine engines; and drive shafts of automobiles. Examples of possible stationary elements include: hulls of underwater vehicles and surface ships, airframes, and automobile chassis. The electronics 202 convert available electrical power 207 into three Pulse Width Modulated (PWM) voltages, which are applied to three electrical phases 208 (which each have two electrical leads) of the mechanical motor/generator assembly 201 and drive the mechanical motor/generator assembly 201. The mechanical motor/generator assembly 201 can operate without the optional electronics 202 for situations in which: available electrical power 207 is suitable for driving the mechanical motor/generator assembly 201 as a motor; or the electrical power produced by the mechanical motor/generator assembly 201, as a generator, is useable (for example, for driving a separate mechanical motor/generator assembly 201 of the present invention, as a motor). Example situations include: when three-phase Alternating Current (AC) electrical power, with sixty-degree phase shifts between the three phases is available; and/or when the available power has been produced by a separate mechanical motor/generator assembly 201 of the present invention, operating as a generator; or the electrical power produced by the mechanical motor/generator assembly 201, as a generator, is useable (for example, for driving a separate mechanical motor/generator assembly 101 of the present invention, as a motor).

FIGS. 10A-10E shows details of the core 203. The core 203 is comprised of: an outer magnet assembly 294; an inner magnet assembly 295; and a base pole piece 211. The outer magnet assembly 294 and the inner magnet assembly 295 are mounted to the base pole piece 211, which maintains concentricity between the outer magnet assembly 294 and the inner magnet assembly 295 to define an annular air gap 224 between the outer magnet assembly 294 and the inner magnet assembly 295. The outer magnet assembly 294 is comprised of: 24 outer 15-degree arc-segment neodymium-iron-boron (NdFeB) rare-earth permanent magnets of grade 52H (also known as N52H magnets) 209; and an outer pole piece 213. The inner magnet assembly 295 is comprised of: 24 inner 15-degree arc-segment N52H magnets 210; and an inner pole piece 212. The 24 outer 15-degree arc-segment magnets 209 are comprised of: 12 outer outward magnets 214, which have their north poles 215 at their outer radii; and 12 outer inward magnets 216, which have their north poles 217 at their inner radii. The 12 outer outward magnets 214 and the 12 outer inward magnets 216 are alternated, as FIGS. 10A-10E show. The 24 inner magnets 210 are comprised of: 12 inner outward magnets 218, which have their north poles 219 at their outer radii; and 12 inner inward magnets 220, which have their north poles 221 at their inner radii. The 24 outer magnets 209 and the 24 inner magnets 210 all have equal axial lengths, L 222. The 24 outer magnets 209 and the 24 inner magnets 210 are configured concentrically and with the relative angular positions (also known as "timing") shown in FIGS. 10A-10E, to produce alternately radially outward magnetic fields 223 through an annular air gap 224 and radially inward magnetic fields 225 through the annular air gap 224.

The base pole piece 211, has a bolt circle of six axial drilled, countersunk, and tapped through mounting holes 226 in the base pole piece 211. The mounting holes 226 and the inside diameter 227 of the base pole piece 211 are used to mount the core 203 to the rotating element 204, as FIG. 9 shows. A tight radial clearance between the inside diameter 227 of the base pole piece 211 and the mating outside diameter of the rotating element 204 (for example, a radial clearance of less than 0.001 inch) ensures good balance and minimizes vibrations during operation of the motor 200. The base pole piece 211 includes an inner increased diameter 228 over which the outside diameter 229 of the inner pole piece 212 slides concentrically during assembly, with a tight gap between the inner increased diameter 228 and the outside diameter 229 (for example, a radial gap of less than 0.001 inch), for accurate concentric alignment for good balance during rotation of the core 203. The base pole piece 211 includes an inner shoulder 230 against which the back face 231 of the inner pole piece 212 mates during assembly. The base pole piece 211 includes an outer reduced diameter 232 over which the inside diameter 233 of the outer pole piece 213 slides concentrically during assembly, with the tight gap between the outer reduced diameter 232 and the inside diameter 233 (for example, a radial gap of less than 0.001 inch), for accurate concentric alignment for good balance during rotation of the core 203. The base pole piece 211 includes an outer shoulder 234 against which the back face 235 of the outer pole piece 211 mates during assembly. The inner pole piece 212 has a magnet retainer 236, which is an area of increased diameter and is used to restrain axial movement of the inner magnets 210 after assembly. The outer pole piece 213 has a magnet retainer 237, which is an area of reduced diameter and is used to restrain axial movement of the outer magnets 209 after assembly.

FIGS. 11A, 11B, and 11C show details of the armature assembly 205, which consists of: an armature 238, and three conductors 239 (for the three-phase motor). The armature 238 is made from titanium alloy 6Al-4V, or an alternative material that is electrically insulating and has strong mechanical properties, including a high yield strength. The armature 238 has a bolt circle of six drilled, countersunk, and tapped through mounting holes 240. The mounting holes 240 and the inside diameter 241 of the armature 238 are used to mount the armature assembly 205 to the stationary element 206. A tight radial clearance between the inside diameter 241 of the armature 238 and the outside diameter of the stationary element 206 (for example, a radial clearance of less than 0.001 inch) ensures good balance and minimizes vibrations during operation of the motor 200. FIG. 12 shows the three conductors 239: (1) an inner conductor 275; a middle conductor 276; and an outer conductor 277. Each of the three conductors 239 consists of: (1) 24 axial conductor bars 278, 279, 280; 12 back cross leads 281, 282, 283; 11 front cross leads 284, 285, 286; and two lead tabs 287, 288, 289. The back cross leads 281, 282, 283 and the front cross leads 284, 285, 286 have approximately one third the radial thickness of the conduction bars 278. The back cross leads 281 and the front cross leads 284 of the inner conductor 275 are located near the inside diameter of the inner conductor 275. The back cross leads 282 and the front cross leads 285 of the middle conductor 276 are located near the average diameter of the middle conductor 276. The back cross leads 283 and the front cross leads 286 of the outer conductor 277 are located near the outside diameter of the outer conductor 277. The conductors 239 mate as shown in FIG. 12, with the axial conductor bars 278, 279, 280 side-by-side, with the back cross leads 271, 282, 283 and the front cross leads 284, 285, 286 stacked radially. The conductors 239 are made from copper alloy 101, or an alternative material with a high electrical conductivity and a high thermal conductivity. Each of the three conductors 239 has a radial mounting hole 244 through each of the lead tabs 287, 288, 289, for connections to the three electrical phases 208 (FIG. 9 shows the three electrical phases 208). The three conductors 239 are coated with a thin layer of insulating material (sometimes called "insulating varnish") and bonded to the armature 238 with an adhesive, so the conductors 239 can transmit torque to or from the armature 238.

FIG. 13 shows the optional electronics 202, which include: an absolute rotary encoder 247; a Field Programmable Gate Array (FPGA) controller 248; an Integrated Circuit (IC) gate driver 249; twelve Insulated Gate Bipolar Transistors (IGBTs) 250; a high-power Direct Current (DC) power supply 251; and a low-power DC power supply 252 for the FPGA controller 248 and the IC gate driver 249. The electronics 202 have a similar configuration to electronics that are used with existing Alternating Current (AC) motors; however, the electronics of the present invention use a control scheme to control our motor 200 that is fundamentally different than control schemes of existing motors. One end of the encoder 253 mounts to the rotating element 204, and the other end of the encoder 254 mounts to the stationary element 206. The encoder 247 measures the angular position of the core 203. The FPGA controller 248 reads three inputs: (1) an input 255 that specifies whether the FPGA controller 248 uses torque control, speed control, or position control; (2) an input 256 that specifies the desired torque or rotational speed; and (3) the output 257 of the encoder 247. The FPGA controller 248 uses a computational control scheme (for example, Proportional+Integral+Derivative, PID, control) to calculate appropriate times to fire each of the twelve IGBTs 250, and outputs twelve digital signals 258 to the IC gate driver 249. The twelve digital signals 258 are commands for firing (or not firing) each of the twelve IGBTs 250. The IC gate driver 249 reads the twelve digital signals 258 from the FPGA controller 248, executes safeguards, and outputs twelve digital signals 259 to the twelve IGBTs 250. The IC gate driver 249 also electrically isolates the outputs 259 from the inputs 258 (using opto-isolators, for example). When the IGBTs 250 are fired appropriately, current can flow through the IGBT 250, in either direction, from (or to) the high-power Direct Current (DC) power supply 251 to (or from) the mechanical motor/generator assembly 201. The high-power DC power supply 251 converts available electrical power 207 (for example, AC or DC electrical power) into DC electrical power 270 that is suitable for driving the motor 200.

The twelve IGBTs 250 form three full H-bridge circuits 260, with four IGBTs 250 for each of the three full H-bridge circuits 260. The operation of each full H-bridge circuit 260 is similar to the operation of the full H-bridge circuit 160 described above and shown in FIGS. 5A-5C.

FIG. 14 shows how the control scheme in the FPGA controller 248 fires the IGBTs 250 of the three full H-Bridge circuits 260 at full power, depending on the angular position, Θ, of the core 203. When the core 203 has the angular position, Θ, shown in FIG. 14, portions 265 of the inner conductor 275 produce positive (clockwise) torque on the core 203, and the rest of the inner conductor 275 produces negative (counterclockwise) torque on the core 203. All of the middle conductor 276 and all of the outer conductor 277 produce negative (counterclockwise) torque on the core 203. The net torque on the core 203 is less than if all of the inner conductor 275 produced negative torque. When the angular position of the core 203 has values Θ=0°, 15°, and multiples of 15°, all three of the conductors 275, 276, 277 produce negative torque, so the torque-generation efficiency (defined by EQN. 2 above) is $\eta_T=1$. When the angular position of the core 203 has values Θ=7.5°, 22.5°, 37.5°, etc. (mid-way between the angular positions for $\eta_T=1$), then one half of one of the conductors 275, 276, or 277 produces positive torque and one half of the same conductor 275, 276, or 277 produces negative torque with an equal magnitude, so the net torque on the core 203 is zero, while the other two conductors 276, 277 or 275, 277 or 275, 276 fully produce negative torque, so the torque-generation efficiency is $\eta_T=\frac{2}{3}$. For intermediate angular positions of the core 203, the torque-generation efficiency is a linear function of the angular position, Θ, of the core 203. The integrated average of the torque-generation efficiency over a fill cycle, at full power, is $\overline{\eta}=(1+\frac{2}{3})/2=\frac{5}{6}$.

FIGS. 15A-15F show how the control scheme in the FPGA controller 248 fires the IGBTs 250 of the three fill H-Bridge circuits 260 at part power, depending on the angular position, Θ, of the core 203, to maximize the torque-generation efficiency of the motor 200 at all power levels. For fractional power levels below ⅔, the FPGA controller 248 fires only the two full H-bridge circuits 260 that are associated with the two conductors 276, 277 or 275, 277 or 275, 276 that fully produce negative (counterclockwise) torque on the rotor. For fractional power levels slightly above ⅔, the FPGA controller 248 fires the IGBTs 250 associated with the remaining conductor 275, 276, or 277 only when most of the conductor 275, 276, or 277 is exposed to one magnetic field (as shown in FIGS. 15A, 15B, and 15C), so the torque-generation efficiency is near one: $\eta_T \approx 1$. As the fractional power level is increased, the FPGA controller 248 increases the widths of the pulse, to include angular positions of the core 203, $\Theta$, for which the torque-generation efficiency is increasingly smaller (as shown in FIGS. 15D, 15E, and 15F). The integrated average of the torque-generation efficiency over a fill cycle, at part power, varies linearly from one (near ⅔ power) to the full-power value of $\bar{\eta}_T = 5/6$. For general cases with different numbers of phases, the integrated average of the torque-generation efficiency, as a function of fractional power level, f, is:

$$\bar{\eta}_T = \begin{cases} 1, & \text{if } f \le 1 - \frac{1}{Z}. \\ 1 - \frac{1}{2Z} + \frac{1-f}{2}, & \text{otherwise} \end{cases} \quad (4)$$

where,

Z=Number of phases, −; and
f=(Power Input)/(Maximum Power Input), −.

For torque control, the FPGA controller 248 adjusts the power level, f, and uses EQN. 4 to achieve the input desired torque 256. For speed control and position control, the FPGA controller 248 uses a computational control scheme (Proportional+Integral+Derivative, PID, control, for example) to calculate the power level, f, that is required to reach the input desired rotational speed or position 256, and uses EQN. 4 to achieve the desired rotational speed or position 256.

The mechanical motor/generator assembly 201 uses the same method to reject waste heat as described above and shown in FIG. 8.

Preferred Embodiment of the Invention

A Three-Phase 120-Pole Motor with Axially Oriented Magnetic Fields

A three-phase 120-pole design with axially oriented magnetic fields is a preferred mode for implementing the invention for motor and/or generator applications that require high rotational speeds and a large Inside Diameter (ID) of the motor/generator. The preferred embodiment with axially oriented magnetic fields is well-suited for high rotational speeds because the core exerts centripetal forces on the magnets that prevent radially outward motion of the magnets. Applications of the preferred embodiment include rim-driven ducted fans and hydraulic propulsors. FIG. 16 shows a three-phase 120-pole design of our motor 300 with axially oriented magnetic fields. The motor 300 is comprised of: a mechanical motor/generator assembly 301 and optional electronics 302. The mechanical motor/generator assembly 301 is comprised of: a core 303, which is attached to, and rotates with, a rotating element 304; and an armature assembly 305, which is mounted to, and stays stationary with, a stationary element 306. Examples of possible rotating elements include: rims of rim-driven ducted fans for Unmanned Aerial Vehicles (UAVs) and hydraulic propulsors/thrusters for Unmanned Underwater Vehicles (UUVs). Examples of possible stationary elements include: duct structures of ducted fans for UAVs and hydraulic propulsors/thrusters for UUVs. The electronics 302 convert available electrical power 307 into three Pulse Width Modulated (PWM) voltages, which are applied to three electrical phases 308 (which each have two electrical leads) of the mechanical motor/generator assembly 301 and drive the mechanical motor/generator assembly 301. The mechanical motor/generator assembly 301 can operate without the optional electronics 302 for situations in which: available electrical power 307 is suitable for driving the mechanical motor/generator assembly 301 as a motor. Example situations include: when three-phase Alternating Current (AC) electrical power, with sixty-degree phase shifts between the three phases is available; and/or when the available power has been produced by a separate mechanical motor/generator assembly 301 of the present invention, operating as a generator; or the electrical power produced by the mechanical motor/generator assembly 301, as a generator, is useable (for example, for driving a separate mechanical motor/generator assembly 301 of the present invention, as a motor).

FIGS. 17A-17F show details of the core 303. The core 303 is comprised of: drive-side magnet assembly 394; a back-side magnet assembly 395; and a base pole piece 311. The drive-side magnet assembly 394 and the back-side magnet assembly 395 are mounted to the base pole piece 311, which maintains concentricity between the drive-side magnet assembly 394 and the back-side magnet assembly 395 to define an annular air gap 324 between the drive-side magnet assembly 394 and the back-side magnet assembly 395. The drive-side magnet assembly 394 is comprised of: 120 drive-side 3-degree arc-segment neodymium-iron-boron (NdFeB) rare-earth permanent magnets of grade 52H (also known as N52H magnets) 309; and a drive-side pole piece 313. The back-side magnet assembly 395 is comprised of: 120 back-side 3-degree arc-segment N52H magnets 310; and a back-side pole piece 312. The 120 drive-side 3-degree arc-segment magnets 309 are comprised of: 60 drive-side positive magnets 314, which have their north poles 315 closer to mounting holes 326 of the core 303 than their south poles 390; and 60 drive-side negative magnets 316, which have their south poles 391 closer to mounting holes 326 of the core 303 than their north poles 317. The 60 drive-side positive magnets 314 and the 60 drive-side negative magnets 316 are alternated, as FIGS. 17A-17F show. The 120 back-side magnets 310 are comprised of: 60 back-side positive magnets 318, which have their north poles 319 closer to mounting holes 326 of the core 303 than their south poles 392; and 60 back-side negative magnets 320, which have their south poles 393 closer to mounting holes 326 of the core 303 than their north poles 321. The 120 drive-side magnets 309 and the 120 back-side magnets 310 all have equal radial lengths, L 322. The 120 drive-side magnets 309 and the 120 back-side magnets 310 are configured concentrically and with the relative angular positions (also known as "timing") shown in FIGS. 17A-17F, to produce alternately axial magnetic fields directed toward mounting holes 326 of the core 303, through an annular air gap 324, and axial magnetic fields directed away from the mounting holes 326 of the core 303, through the annular air gap 324.

The drive-side pole piece 312, has a bolt circle of twelve axial drilled, countersunk, and tapped through mounting holes 326 in the drive-side pole piece 312. The mounting holes 326 and the inside diameter 327 of the base pole piece 311 are used to mount the core 303 to the rotating element 304, as FIG. 16 shows. A tight radial clearance between the inside diameter 327 of the base pole piece 311 and the mating outside diameter of the rotating element 304 (for example, a radial clearance of less than 0.001 inch) ensures good balance and minimizes vibrations during operation of the motor 300. The base pole piece 311 includes two outer reduced diameters 328 over which the inside diameters 329 of the drive-side pole piece 312 and the back-side pole piece 313 slide concentrically during assembly, with a tight gap between the inner reduced diameters 328 and the inside diameters 329 (for example, a radial gap of less than 0.001 inch), for accurate concentric alignment for good balance during rotation of the core 303. The base pole piece 311 includes shoulders 330 against which faces 332 of the drive-side pole piece 312 and the back-side pole piece 313 mate during assembly. The drive-side pole piece 312 and the back-side pole piece 313 have annular pockets 333 into which the 120 drive-side magnets 309 and the 120 back-side magnets 310 seat. The outside-diameter walls 334 of the annular pockets 333 exert centripetal forces on the drive-side magnets 309 and the back-side magnets 310 that prevent radially outward motion of the magnets 309, 310.

FIGS. 18A, 18B, and 18C show details of the armature assembly 305, which consists of: an armature 338, and three conductors 339 (for the three-phase motor). The armature 338 is made from titanium alloy 6Al-4V, or an alternative material that is electrically insulating and has strong mechanical properties, including a high yield strength. The armature 338 has a bolt circle of 24 drilled, countersunk, and tapped through mounting holes 340. Twelve of the mounting holes 340 and the outside diameter 341 of the armature 338 are used to mount the armature assembly 305 to the stationary element 306. A tight radial clearance between the outside diameter 341 of the armature 338 and the inside diameter of the stationary element 306 (for example, a radial clearance of less than 0.001 inch) ensures good balance and minimizes vibrations during operation of the motor 300. FIG. 19 shows the three conductors 339: (1) a bottom conductor 375; a middle conductor 376; and a top conductor 377. Each of the three conductors 339 consists of: (1) 120 radial conductor bars 378, 379, 380; 60 inside-diameter cross leads 381, 382, 383; 59 outside-diameter cross leads 384, 385, 386; and two lead tabs 387, 388, 389. The inside-diameter cross leads 381, 382, 383 and the outside-diameter cross leads 384, 385, 386 have approximately one third the axial thickness of the conduction bars 378. The inside-diameter cross leads 381 and the outside-diameter cross leads 384 of the bottom conductor 375 are located near the drive-side magnets 309 of the mechanical motor/generator assembly 301. The inside-diameter cross leads 382 and the outside-diameter cross leads 385 of the middle conductor 376 are located near the axial mid-point of the middle conductor 376. The inside-diameter cross leads 383 and the outside-diameter cross leads 386 of the top conductor 377 are located near the back-side magnets 310 of the mechanical motor/generator assembly 301. The conductors 239 mate as shown in FIG. 19, with the radial conductor bars 378, 379, 380 side-by-side, with the inside-diameter cross leads 371, 382, 383 and the outside-diameter cross leads 384, 385, 386 stacked axially. The conductors 339 are made from copper alloy 101, or an alternative material with a high electrical conductivity and a high thermal conductivity. Each of the three conductors 339 has an axial mounting hole 344 through each of the lead tabs 387, 388, 389, for connections to the three electrical phases 308 (FIG. 16 shows the three electrical phases 308). The three conductors 339 are coated with a thin layer of insulating material (sometimes called "insulating varnish") and bonded to the armature 338 with an adhesive, so the conductors 339 can transmit torque to or from the armature 338.

The optional electronics 302 of the 3-phase 120-pole preferred embodiment of the motor with axially oriented magnetic fields are similar to the optional electronics 202 of the 3-phase 24-pole preferred embodiment of the motor described above, except the period of the cycle for the 3-phase 120-pole preferred embodiment is 6 degrees and the period of the cycle for the 3-phase 24-pole preferred embodiment is 30 degrees, as FIGS. 15A-15F indicate.

The mechanical motor/generator assembly 301 uses a similar method to reject waste heat as described above for the 1-phase two-pole preferred embodiment and shown in FIG. 8; however, the direction of heat flow is radial in the mechanical motor/generator assembly 301 and the direction of heat flow for the 1-phase two-pole preferred embodiment is axial.

Performance Projections

The invented motor/generator has the potential to be much more power-dense, efficient, and inexpensive than the best current-art motors/generators. Therefore, the invented motor/generator is highly useful for reducing the sizes, weights, and costs and increasing the efficiencies of motors/generators for many applications, including: turbo-generators for generating electrical power from thermal power from hydrothermal vents on the ocean floors; motors and generators for underwater vehicles, including submarines and Unmanned Underwater Vehicles (UUVs); motors and generators for surface ships, including U.S. Navy all-electric surface ships and Unmanned Surface Vehicles (USVs); turbo-generators for offshore oil rigs; generators for land-based power generation and co-generation; motors and generators for land vehicles, including hybrid-electric and Electric Vehicles (EVs); industrial motors; motors for home appliances; motors and generators for aircraft, including urban air taxis, hybrid-electric and electric commercial aircraft, military more-electric aircraft, Unmanned Aerial Vehicles (UAVs), and Unmanned Aerial Systems (UASs); motors and actuators for spacecraft; and generators for space-based power generation.

FIGS. 20-23 show three designs of the invented motor/generator: (1) a 70-hp motor with radial magnetic fields; (2) a 150-hp motor with axial magnetic fields; (3) a 200-hp motor with radial magnetic fields; and (4) a 1-MW motor with radial magnetic fields. TAB. 1 lists specifications and performance projections for the four motor designs. TAB. 2 compares the performance projections with the performances of current-art motors. FIG. 24 compares the power-densities of the designs of the invented motor with power densities of current-art motors. As TAB. 2 and FIG. 24 show, the invented motor achieves much higher power-densities and efficiencies than current-art motors. The following gives the equations that support the performance projections listed in TAB. 1.

The motor produces forces on the conductors and reaction forces on the core, according to the Lorentz force, which in scalar form is F=i L B. Therefore, the torque on the core is:

$$\tau = \frac{\eta_T i L B D}{2} \tag{5}$$

where,
η_T=Torque-generation efficiency,
i=Electrical current, A;
L=Length of magnets, m;
B=Magnetic field strength in the air gap, T; and
D=Average diameter of the air gap.

The power output of the motor is the torque times the rotational angular frequency:

$$w = \tau\omega \tag{6}$$

where,
w=Power output of the motor, W; and
ω=Rotational angular frequency, rad/s.

EQNS. 5 and 6 can be combined to obtain:

$$w = \frac{\eta_T i L B D \omega}{2} \tag{7}$$

EQN. 7 can be solved for the electrical current, to obtain:

$$i = \frac{2w}{\eta_T L B D \omega} \tag{8}$$

The efficiency of the electrical machine (an electrical machine refers to either a motor or a generator) is defined as the power output of the electrical machine, divided by the power input to the electrical machine:

$$\eta_M \equiv \frac{w}{w_i} \tag{9}$$

where,
η_M=Efficiency of the electrical machine, –;
w_i=Power input to the electrical machine, W; and
w=Power output of the electrical machine, W.

The electrical loss of the electrical machine is defined as the power input to the machine, minus the power output of the machine:

$$q_L = w_i - w \tag{10}$$

where, $q_L$, is the electrical loss of the electrical machine, W.
EQNS. 8 and 9 can be combined to obtain:

$$q_L = \left(\frac{1}{\eta_M} - 1\right) w \tag{11}$$

The only significant electrical loss in the invented motor/generator is due to Joule heating (which is sometimes called "i²R loss"):

$$q_L = i^2 R \tag{12}$$

where,
i=Electrical current, A; and
R=Electrical resistance, Ω.

The electrical resistance can be calculated as follows:

$$R = \frac{\rho_C L_T}{A_{CS}} \tag{13}$$

where,
ρ_C=Electrical resistivity of the conductor material, Ω-m;
L_T=Length of one axial pass of the conductor through the electrical machine, m; and
A_CS=Total cross-sectional area of all conductors in the air gap, m².

A conductor length efficiency is defined as the axial length of the magnets, divided by the length of one axial pass of the conductor through the electrical machine:

$$\eta_L = \frac{L}{L_T} \tag{14}$$

where,
η_L=Conductor length efficiency, –; and
L=Axial length of the magnets, m.

A packing efficiency is defined as the total cross-sectional area of all conductors in the air gap, divided by the total cross-sectional area of the annular air gap:

$$\eta_P = \frac{A_{CS}}{A_G} \tag{15}$$

where,
η_P=Packing efficiency, –; and
A_G=Total cross-sectional area of the annular air gap, m².

The total cross-sectional area of the annular air gap can be calculated as follows:

$$A_G = \pi g D \tag{16}$$

where,
g=Length of the air gap, m; and
D=Average diameter of the air gap, m.

EQNS. 11-16 can be combined and solved for the power output of the motor, to obtain:

$$w = \frac{\pi \eta_T^2 \left(\frac{1}{\eta_M} - 1\right) \eta_P \eta_L D^3 g B^2 \omega^2 L}{4 \rho_C} \tag{17}$$

The power output of the invented motor with axial magnetic fields can be calculated similarly.

Each conductor produces waste heat through Joule heating. The temperatures of the portions of each conductor that are inside the core during operation must be hotter than the temperatures of the external portions of each conductor, to drive heat conduction from within the core to the external portions of each conductor. The temperatures of the magnets must not exceed the maximum working temperatures of the magnets, so the magnets maintain their magnetic strengths. The maximum temperature of each conductor, which is the maximum temperature in the invented motor/generator is calculated. A maximum temperature that is less than the maximum working temperature of the magnets guarantees the magnets do not reach their maximum working temperatures during operation.

FIG. 25 shows a model of heat transfer in the invented motor/generator. Joule heating occurs approximately uniformly throughout each conductor. For the control volume shown in FIG. 25, the Joule heating is balanced by the net heat conduction out of the control volume:

$$q_L\left(\frac{dx}{L_T}\right) = k A_{CS} \frac{dT}{dx}\bigg|_x - k A_{CS} \frac{dT}{dx}\bigg|_{x+dx} \tag{18}$$

where,
x=Distance along the conductor (see FIG. 26), m;
dx=Differential length (see FIG. 26), m;
k=Thermal conductivity of the conductor material, W/m-K; and
T=Temperature of the conductor, K.
EQN. 18 reduces to the following:

$$\frac{d^2\Theta}{d\varsigma^2} = -\frac{q_L L_T}{kA_{CS}} \quad (19)$$

where,
$\Theta = T - T_0$ (see FIG. 26), –; and
$\varsigma = x/L_T$, –.
EQN. 19 has two boundary conditions. By definition:

$$\Theta(\chi=0)=0 \quad (20)$$

Zero heat transfer from the conductor can be assumed, at the point of greatest insertion of the conductor into the core:

$$\left.\frac{d\Theta}{d\varsigma}\right|_{\varsigma=1} = 0 \quad (21)$$

The solution to EQNS. 19-21 is:

$$\Theta(\varsigma) = \beta(\varsigma - \varsigma^2/2) \quad (22)$$

where, $$\beta \equiv \frac{q_L L_T}{kA_{CS}} \quad (23)$$

EQN. 22 has the following maximum value at the point of greatest insertion into the core:

$$\Theta_X = \frac{\beta}{2} \quad (24)$$

where $Q_X$ is the maximum value of EQN. 22. The maximum conductor temperature is:

$$T_X = T_0 + \frac{\beta}{2} \quad (25)$$

where $T_X$ is the maximum conductor temperature, K.
The derivation of the maximum conductor temperature for the invented motor with axial magnetic fields, with small magnet lengths compared to the inside radius of the conductor, is similar, with the parameter p replaced with the following:

$$\beta_R \equiv \frac{q_L R_I^2}{2\pi kg(R_O^2 - R_I^2)} \quad (26)$$

where,
$R_I$=Inside radius of the conducer, m; and
$R_O$=Outside radius of the conductor, m.

Proof of Concept

A three-phase 12-pole design of our motor, with radially oriented magnetic fields, and that includes commercially available rare-earth magnets, is a preferred mode for implementing the invention for proof-of-concept demonstration of the invented motor technology. FIG. 26 shows a three-phase 12-pole design of our motor 400 with radially oriented magnetic fields. The motor 400 is comprised of: a mechanical motor/generator assembly 401 and optional electronics 402. The mechanical motor/generator assembly 401 is comprised of: a core 403, which is attached to, and rotates with, a rotating element 404; and an armature assembly 405, which is mounted to, and stays stationary with, a stationary element 406. The electronics 402 convert available electrical power 407 into three voltages, which are applied to three electrical phases 408 (which each have two electrical leads) of the mechanical motor/generator assembly 401 and drive the mechanical motor/generator assembly 401, The mechanical motor/generator assembly 401 can operate without the optional electronics 402 for situations in which: available electrical power 407 is suitable for driving the mechanical motor/generator assembly 401 as a motor. Example situations include: when three-phase Alternating Current (AC) electrical power, with sixty-degree phase shifts between the three phases is available; and/or when the available power has been produced by a separate mechanical motor/generator assembly 401 of the present invention, operating as a generator; or the electrical power produced by the mechanical motor/generator assembly 401, as a generator, is useable (for example, for driving a separate mechanical motor/generator assembly 401 of the present invention, as a motor).

FIGS. 27A-27E shows details of the core 403. The core 403 is comprised of: an outer magnet assembly 494; and an inner magnet assembly 495. The outer magnet assembly 494 and the inner magnet assembly 495 mate to define an annular air gap 425 between the outer magnet assembly 494 and the inner magnet assembly 495. The outer magnet assembly 494 is comprised of: 12 outer 30-degree arc-segment neodymium-iron-boron (NdFeB) rare-earth permanent magnets of grade 50 (also known as N50 magnets) 409; and an outer pole piece 412, to which the 12 outer magnets 409 mate. The 12 outer magnets 409 are comprised of: 6 outer positive magnets 414, which have their north poles 415 at their outside radii; and 6 outer negative magnets 416, which have their north poles 417 at their inside radii. The 6 outer positive magnets 414 and the 6 outer negative magnets 416 are alternated. The inner magnet assembly 495 is comprised of: 12 inner 30-degree arc-segment neodymium-iron-boron (NdFeB) rare-earth permanent magnets of grade 52 (also known as N52 magnets) 410; and an inner pole piece 413, to which the 12 inner magnets 410 mate. The 12 inner magnets 410 are comprised of: 6 inner positive magnets 418, which have their north poles 419 at their outside radii; and 6 inner negative magnets 420, which have their north poles 421 at their inside radii. The 6 inner positive magnets 418 and the 6 inner negative magnets 420 are alternated. TAB. 3 lists details (including dimensions) of the 12 outer magnets 409 and the 12 inner magnets 410. The outer magnet assembly 494 and the inner magnet assembly 495 mate to maintain concentricity of the 12 outer arc-segment magnets 409 and the 12 inner arc-segment magnets 410, and with the relative angular positions (also known as "timing") of the magnets shown in FIGS. 27A-27E, to produce alternately radially outward time-invariant magnetic fields through an annular air gap 424 and radially inward time-invariant magnetic fields through the air gap 424. The inner pole piece 413 includes an axial drilled, countersunk, and tapped (with ¼-20 threads) hole 426 and a reduced diameter 427, which are used to mount the core 403 to a rotating element 404, as shown in FIG. 26.

FIGS. 28A-28C show details of the armature assembly 405, which consists of: an armature 438; three conductors 439 (for the three-phase motor); and six lead-mounting screws 442. The armature 438 is made from black ultra-high molecular weight (UHMW) polyethylene, which is electrically insulating. The armature 438 includes an axial drilled and tapped (with ¼-20 threads) hole 465 and a reduced diameter 441, which are used to mount the armature 438 to a stationary element 406, as shown in FIG. 26. The armature 438 includes 36 front radial holes 440 and 36 rear radial holes 466. The diameters of the front holes 440 and the rear holes 466 are 1/16 inch. The armature 438 includes 6 drilled and tapped (#6-32 threads) radial flange holes 467, into which six lead-mounting #6-32×¼ inch 18-8 stainless steel socket head cap screws 442 mount.

The three conductors 439 are three lengths of NEMA MW16-C, 24 AWG HML (heavy polymide build) magnet wire. Each of the three conductors 439 is threaded through 12 of the 36 front radial holes 440 and 12 of the 36 rear radial holes 466, with each conductor passing through each hole three times. FIG. 28A shows the threading pattern 468, given by Number Points 1-14, for one of the three conductors 439. The two ends of each of the three conductors 439 wrap around two of the six lead-mounting screws 442.

FIG. 29 shows the optional electronics 402. The electronics 402 comprise: a digital circuit 443; and three Direct Current (DC) four-quadrant power supplies 444. The digital circuit 443 produces three digital square-wave voltages 445, 446, 447, as plotted in FIGS. 30A-30C: (1) a voltage for Phase A 445; (2) a voltage for Phase B 446; (3) and a voltage for Phase C 447. The three digital voltages 445, 446, 447 are input to the three DC power supplies 444, which produce three output voltages 448, 449, 450 that track the three digital voltages 445, 446, 447. Six lead wires 451, connect the three output voltages 448, 449, 450 of the three DC power supplies 444 to the six lead-mounting screws 442 of the armature assembly 405. Available electrical power 407 drives the three DC power supplies 444.

The digital circuit 443 comprises: a straight ring counter 452 (which is also known as a "one-hot counter"); and six OR gates 453, 454, 455, 456, 457, 458. The ring counter 452 includes six latches (which are also known as flip-flops) 459, 460, 461, 462, 463, 464. The outputs of Latch 1 459 and Latch 2 460 are input to OR Gate 1 453. The output of Latch 3 461 and OR Gate 1 453 are input to OR Gate 2 454. The output of OR Gate 2 454 is the digital voltage for Phase A 445. The outputs of Latch 2 460 and Latch 3 461 are input to OR Gate 3 455. The outputs of Latch 4 462 and OR Gate 3 455 are input to OR Gate 4 456. The output of OR Gate 4 456 is the digital voltage for Phase B 446. The outputs of Latch 3 461 and Latch 4 462 are input to OR Gate 5 457. The outputs of Latch 5 463 and OR Gate 5 457 are input to OR Gate 6 458. The output of OR Gate 6 458 is the digital voltage for Phase C 447.

The mechanical motor/generator assembly 401 uses forced-convection heat transfer to reject waste heat from the conductors. The rotation of the core 403 in close proximity to the armature assembly 405 produces air drafts that cool the conductors and reject waste heat to the ambient environment.

Additional Embodiments and Applications of the Invention

Although various embodiments of the invention have been disclosed here for purposes of illustration, it should be understood that various changes, modifications, and substitutions may be incorporated without departing from the spirit of the invention, which is defined by the claims below. Examples of the various changes, modifications, and substitutions include:

1. Different geometries and configurations of the cross leads.
2. Different magnet materials and grades. The optimal material and grade depends on cost, maximum working temperature, and required magnetic field strength.
3. Different dimensions of the pole pieces, the magnets, and the air gap. Optimal dimensions depend on required performance (power level and efficiency), weight, and cost.
4. Different diameters and numbers of mounting holes in the armature and the base pole piece. The optimum diameter and number of holes depends on the maximum torque, the type of material from which mounting screws are made, etc.
5. Different types of mounting holes, including through holes (for use with combinations of screws and nuts), blind holes, etc.
6. Different materials for the armature.
7. Different materials for the conductors, including different copper alloys and different silver alloys.
8. Different means for rejecting heat from the external portions of the conductor(s) to the ambient environment, including: direct rejection, through natural-convection or forced-convection heat transfer; indirect rejection, through a heat exchanger with cooling fins (which are cooled by either natural-convection or forced-convection heat transfer), and/or with heat pipes and/or with a circulating fluid, which reject(s) heat to a secondary heat exchanger. The heat exchanger and/or the secondary heat exchanger can be cooled by an active refrigerator (for example, a thermo-electric cooler or a Stirling-cycle refrigerator).
9. Use of electro-magnets to produce time-invariant magnetic fields in the air gap.

The invented electrical machine can be used in combination with a wide range of additional parts or assemblies, including: turbo-generators for generating electrical power from thermal power from hydrothermal vents on the ocean floors; underwater vehicles, including submarines and Unmanned Underwater Vehicles (UUVs); surface ships, including U.S. Navy all-electric surface ships and Unmanned Surface Vehicles (USVs); turbo-generators for offshore oil rigs; land-based power-generation and co-generation systems; land vehicles, including hybrid-electric and Electric Vehicles (EVs); industrial equipment and machine tools; home appliances; aircraft, including electric jet packs and urban air taxis, hybrid-electric and electric commercial aircraft, military more-electric aircraft, Unmanned Aerial Vehicles (UAVs), and Unmanned Aerial Systems (UASs); spacecraft; and space-based power-generation systems.

What is claimed is:

1. A mechanical motor/generator assembly, comprising:
    a core assembly comprising two magnet assemblies positioned to define an air gap therebetween and producing time invariant magnetic fields in the air gap; and
    an armature assembly comprising an armature and one or more conductors mounted to the armature, the one or more conductors having electrical leads, the one or more conductors being positioned in the air gap, wherein the core assembly is mounted to a rotating element and the armature assembly is mounted to a stationary element;

wherein the one or more conductors are aligned in the air gap such that in operation electrical current flows in alternating directions in the one or more conductors, to produce torque on the armature and the rotating element when a voltage is applied across the one or more conductors for motor action and to produce electrical current when torque is applied to the rotating element and the armature for generator action;

wherein the air gap between the two magnet assemblies does not include a stator pole made of ferromagnetic material.

2. The mechanical motor/generator assembly of claim 1, further comprising an assembly to reject heat produced by the mechanical motor/generator assembly when the mechanical motor/generator assembly is in operation.

3. The mechanical motor/generator assembly of claim 1, the armature assembly to use electrical power with a selected one of a plurality of alternative number of phases.

4. The mechanical motor/generator assembly of claim 1, wherein the mechanical motor/generator assembly to cool the armature assembly through forced-convection heat transfer during operation of the mechanical motor/generator assembly.

5. The mechanical motor/generator assembly of claim 4, wherein the mechanical motor/generator motor assembly to cool the armature assembly using a liquid medium.

6. The mechanical motor/generator assembly of claim 1, wherein the armature includes structural materials other than titanium, including a mixture of epoxy adhesive or potting epoxy and metal powder.

7. The mechanical motor/generator assembly of claim 6, wherein the metal powder is aluminum powder.

8. The mechanical motor/generator assembly of claim 1, wherein the one or more conductors are made from material other than copper.

9. The mechanical motor/generator assembly of claim 1, wherein the one or more conductors are made of Litz wire or wires.

10. The mechanical motor/generator assembly of claim 1, wherein the two magnet assemblies comprise an outer magnet assembly and an inner magnet assembly, the outer magnet assembly and the inner magnet assembly defining an annular air gap.

11. The mechanical motor/generator assembly of claim 10, wherein the one or more conductors of the armature assembly comprise a hollow cylinder conductor that is disposed in the annular air gap.

12. The mechanical motor/generator assembly of claim 11, wherein the hollow cylinder conductor includes two slits located diametrically opposite from each other.

13. The mechanical motor/generator assembly of claim 11, wherein the hollow cylinder conductor is coated with an insulator, and bonded to the armature.

14. The mechanical motor/generator assembly of claim 10, wherein the one or more conductors of the armature assembly comprise a plurality of conductors that encircle the inner magnet assembly in the annular air gap, each conductor comprises a plurality of axial conductor bars that are connected to each other via back cross leads and front cross leads that are orthogonal to the axial conductor bars.

15. The mechanical motor/generator assembly of claim 10, wherein the one or more conductors of the armature assembly comprise a plurality of conductors that encircle the inner magnet assembly in the annular air gap, each conductor comprises a plurality of radial conductor bars that are connected to each other via inside-diameter cross leads and outside-diameter cross leads that are orthogonal to the radial conductor bars.

* * * * *